United States Patent
Aida

(10) Patent No.: US 6,957,728 B2
(45) Date of Patent: Oct. 25, 2005

(54) PULLEY APPARATUS WITH BUILT-IN ROLLER CLUTCH AND THE ASSEMBLY METHOD THEREOF

(75) Inventor: Hiroshi Aida, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/804,831

(22) Filed: Mar. 16, 2004

(65) Prior Publication Data

US 2004/0216974 A1 Nov. 4, 2004

Related U.S. Application Data

(63) Continuation of application No. PCT/JP02/09347, filed on Sep. 12, 2002.

(30) Foreign Application Priority Data

Sep. 17, 2001 (JP) ........................................ 2001-281831

(51) Int. Cl.[7] .......................... F16D 41/067; B23P 17/00
(52) U.S. Cl. ...................... 192/45; 29/892.1; 192/110 B
(58) Field of Search ............................... 192/45, 110 B; 29/892.1; 384/559, 560, 538, 539

(56) References Cited

U.S. PATENT DOCUMENTS

| 3,760,914 A | * | 9/1973 | Geilbrich ..................... 192/45 |
| 3,897,988 A | * | 8/1975 | Dickinson et al. ........... 384/539 |
| 5,048,651 A | * | 9/1991 | Lederman ..................... 192/45 |
| 5,284,285 A | * | 2/1994 | Ferguson ..................... 384/560 |
| 5,722,521 A | | 3/1998 | Awaji et al. |
| 6,116,393 A | | 9/2000 | Ooitsu et al. |
| 6,170,625 B1 | * | 1/2001 | Tanaka ......................... 192/45 |
| 6,394,250 B1 | * | 5/2002 | Ouchi ........................... 192/45 |
| 2003/0141161 A1 | * | 7/2003 | Ouchi ........................... 192/45 |

FOREIGN PATENT DOCUMENTS

| JP | 07-139550 | 5/1995 |
| JP | 08-061374 | 3/1996 |
| JP | 08-226462 | 9/1996 |
| JP | 10-213207 | 8/1998 |
| JP | 10-285873 | 10/1998 |
| JP | 11-022753 | 1/1999 |
| JP | 11-063026 | 3/1999 |
| JP | 11-218160 | 8/1999 |
| JP | 2000-240687 | 9/2000 |
| JP | 2001-032911 | 2/2001 |
| JP | 2001-165201 | 6/2001 |

* cited by examiner

Primary Examiner—Rodney H. Bonck
(74) Attorney, Agent, or Firm—Katten Muchin Rosenman LLP

(57) ABSTRACT

The axial displacement of the clutch retainer 28 of the roller clutch 10 is prevented. And, part of the clutch retainer 28 is prevented from rubbing the portion which rotates together with the follower pulley 7 to suppress the heat generation during overrun. Accordingly, grease degradation is prevented and durability and reliability are improved. Bevel is formed on the inner periphery of the outer clutch-race 25 of the roller clutch 10 and on the outer periphery of rollers 26 at an axial end thereof. Accordingly, the circumferential location of the rollers 26 is properly maintained and the installation of the outer clutch-race 25 on the outer diameter side of the rollers 26 and so the assembling process thereof become easy.

7 Claims, 19 Drawing Sheets

PRIOR ART

Fig. 9
(A)
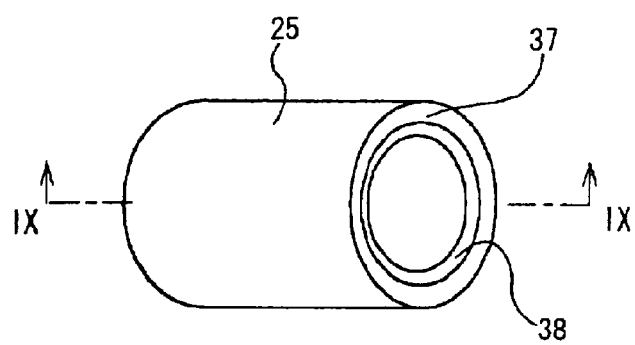
(B)
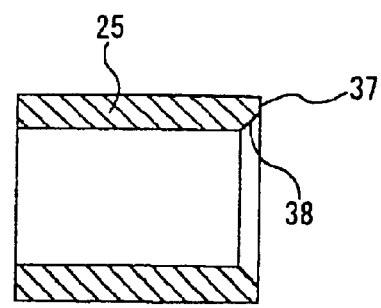
Fig. 10
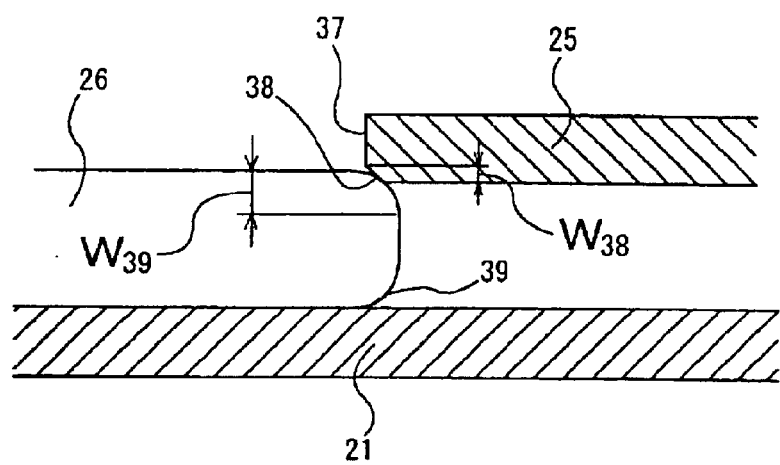

Fig. 12
(A)
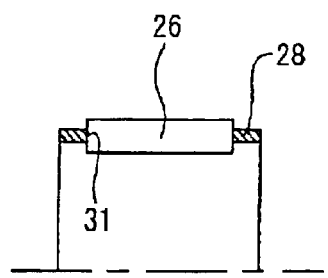
(B)
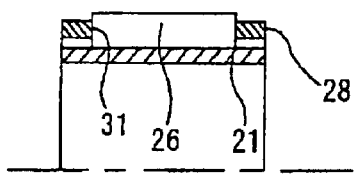
(C)
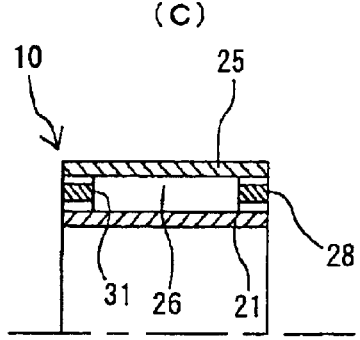
(D)
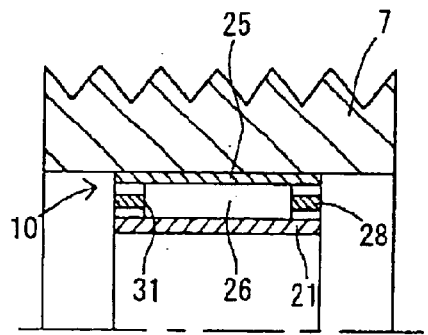
(E)
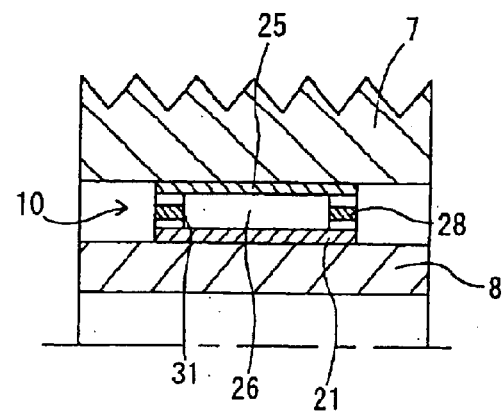
(F)
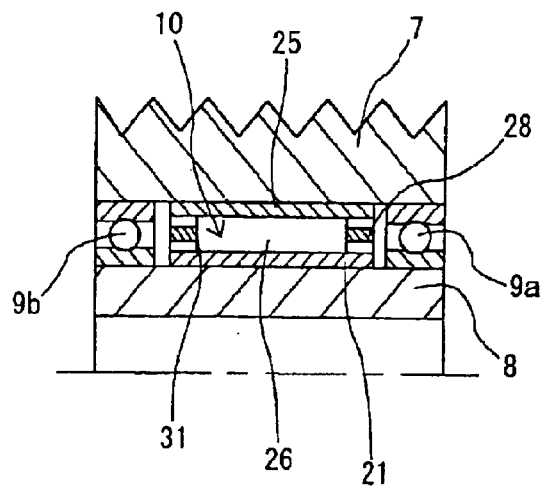

Fig. 23
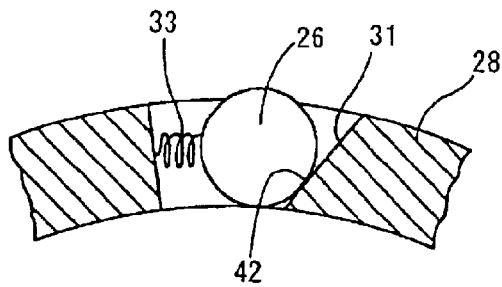
Fig. 24
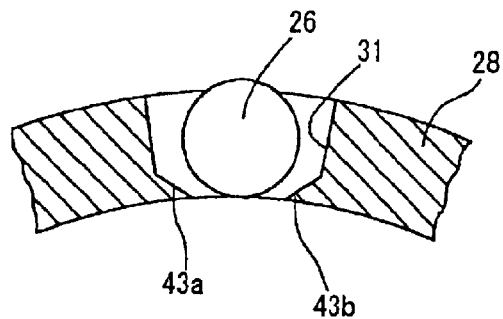
Fig. 25
(A)
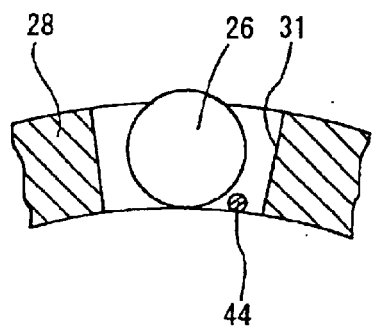
(B)
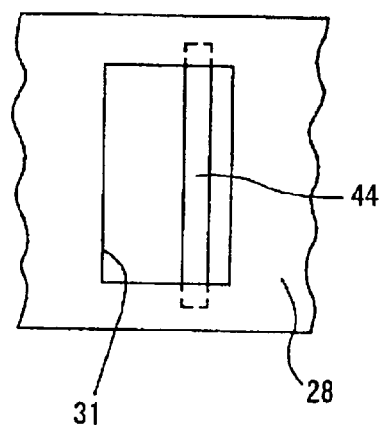

(A)  (B)

(A)  (B)

PULLEY APPARATUS WITH BUILT-IN ROLLER CLUTCH AND THE ASSEMBLY METHOD THEREOF

CROSS-REFERENCE TO RELATED APPLICATION

The present application is a continuation of and claims priority under 35 USC § 120 from International PCT Application No. PCT/JP02/09347, filed on Sep. 12, 2002 which claims priority under 35 USC § 119 from Japanese Patent Application Number 2001-281831 filed on Sep. 17, 2001.

FIELD OF THE INVENTION

This invention relates to improvements to a pulley apparatus with a built-in roller clutch that is used in the drive of auxiliary machinery of an engine, for use in such as the follower pulley fixed to the end of the rotating shaft of the alternator or automobile generator, or the drive pulley fixed to the end of an automobile crankshaft, and to the assembly method thereof.

BACKGROUND TECHNOLOGY

An alternator is used as the drive source for driving the engine of an automobile and performs the necessary power generation for the automobile. The construction of such alternator was disclosed, for example, in Japanese patent publication No. Tokukai Hei 7-139550. FIG. 1 shows the alternator 1 described in that disclosure. A pair of rolling bearings 4 supports a rotating shaft 3 inside a housing 2 such that it rotates freely. A rotor 5 and a commutator 6 are located in the middle section of this rotating shaft 3. Also, there is a follower pulley 7 fixed to one end (right end in FIG. 1) of this rotating shaft 3 in the section that protrudes out from the housing 2. When assembled in an engine, an endless belt runs around this follower pulley 7 such that the rotating shaft 3 can be rotated and driven freely by the crankshaft of the engine.

Conventionally, a pulley that was simply fixed to the rotating shaft 3 was used as this follower pulley 7. However, recently, various kinds of pulley apparatuses with built-in one-way clutches have been proposed, and some have been used where in cases where there is a tendency for the running speed of the endless belt to be constant or to increase, power is transmitted freely to the rotating shaft from the endless belt, and in the case where there is a tendency for the running speed of the endless belt to decrease, the follower pulley rotates freely relative to the rotating shaft. For example, pulley apparatuses with built-in one-way clutches, having the functions described above, have been disclosed in Japanese patent publications Nos. Tokukai Hei 10-213207, 10-285873, 11-22753, and 11-63026. Moreover, the use of a roller clutch as the one-way clutch has also been known, such as described in each of the aforementioned disclosures.

FIGS. 2 to 6 show a previously known pulley apparatus with built-in roller clutch, such as described in these disclosures. This pulley apparatus with built-in roller clutch has a rotating member (or called a shaft member), or more specifically a sleeve 8, that fits around the outside of the rotating shaft 3 of the alternator 1 (see FIG. 1). Also, there is a pulley member, or in other words a follower pulley 7 located around this sleeve 8, such that it is concentric with the sleeve 8. Moreover, there is a pair of ball bearings 9a, 9b and a roller clutch 10 located in the space between the outer peripheral surface of the sleeve 8 and the inner peripheral surface of the follower pulley 7.

The sleeve 8 is formed generally into a substantially cylindrical shape and is fixed to the end of the rotating shaft 3 of the alternator 1 such that it rotates together with the rotating shaft 3. As shown in the example in the figure, in order to do this, a screw hole section 11 is formed around the inner peripheral surface in the middle section of the sleeve 8, and this screw hole section 11 is screwed together with a male screw section that is formed around the outer peripheral surface on the tip end of the rotating shaft 3. Also, a fitting hole section 12, having a hexagonal cross section, is formed on the inner peripheral surface on the tip end (left end in FIG. 2) of the sleeve 8 such that the tip end of a tool such as a hexagonal wrench can fit into this fitting hole section 12. Furthermore, the inner peripheral surface of the base end (right end in FIG. 2) of the sleeve 8 is a circular hole section 13 that freely fits tightly around the tip end of the rotating shaft 3 at a location closer to its middle section without lost motion. It is also possible to use other construction such as a spline joint, non-circular joint, or key joint so that the sleeve 8 does not rotate relative to the rotating shaft 3. Also, the center section of the outer peripheral surface of the sleeve 8 is a large-diameter section 14 that has a larger diameter than other sections.

On the other hand, the outer peripheral surface on the tip-end half of the follower pulley 7 is formed with a wave-shaped cross section in the width direction such that part of an endless belt, called Poly V-belt, can run around it. Also, a roller clutch 10 is located in the middle section in the axial direction of the space between the outer peripheral surface of the sleeve 8 and the inner peripheral surface of the follower pulley 7, and ball bearings 9a, 9b are located on both ends in the axial direction of this space such that they hold the roller clutch 10 on both sides in the axial direction.

The ball bearings 9a, 9b support radial loads and axial loads that are applied to the follower pulley 7 such that the follower pulley 7 can rotate freely with respect to the sleeve 8. Each of the ball bearings 9a, 9b comprises: an outer race 16 having an outer-raceway 15 of the deep-groove type formed around its inner peripheral surface; an inner race 18 having an inner-raceway 17 of the deep-grooved type formed around its outer peripheral surface; and a plurality of balls 19 located between the outer-raceway 15 and the inner-raceway 17, such that they can rotate freely. Also, the outer race 16 is fitted and fastened around the inner peripheral surface on both ends of the follower pulley 7, and the inner race 18 is fitted and fastened around the outer peripheral surface on both ends of the sleeve 8. Moreover, in this state, one surface in the axial direction of each inner race 18 comes in contact with the respective end surface (stepped surface) in the axial direction of the large-diameter section 14. Furthermore, seal rings 20 are located between the inner peripheral surface around both ends of the outer races 16 and the outer peripheral surface around both ends of the inner races 18 to cover the openings on both ends of the space where the balls 19 are located.

The roller clutch 10 transmits rotating force between the follower pulley 7 and sleeve 8 only when the follower pulley 7 tends to rotate in a specified direction with respect to the sleeve 8. In order to construct this kind of roller clutch 10, an inner clutch-race 21 is tightly fitted and fastened around the large-diameter section 14 of the sleeve 8. This inner clutch-race 21 is formed into a generally circular shape by performing plastic working, such as pressing steel plate like carburized steel, and a cam surface 22 is formed around its outer peripheral surface. In other words, the cam surface 22 can be formed around the outer peripheral surface by forming a plurality of concave sections 23, called ramp sections, around the outer peripheral surface of the inner clutch-race 21 such that they are uniformly spaced around in the circumferential direction as shown in FIGS. 3 and 5. In the example shown in the figures, a tapered concave beveled section 24 is formed around one end (left end in FIG. 2) around the inner peripheral surface of the inner clutch-race 21, and this beveled section 24 functions as a guide surface for when pressure fitting the inner clutch-race 21 around the outer peripheral surface of the large-diameter section 14.

On the other hand, an outer clutch-race 25 is tightly fitted and fixed in the middle section of the inside peripheral surface of the follower pulley 7, and at least the middle section in the axial direction of the inner peripheral surface of the outer clutch-race 25 that comes in direct contact with a roller 26 (described below) is a simple cylindrical surface. This kind of outer clutch-race 25 is also formed into a generally cylindrical shape by plastic working e.g. pressing steel plate like carburized steel plate, and inward facing flange sections 27a, 27b are formed on both ends in the axial direction of the outer clutch-race 25. Of the two flange sections 27a, 27b, the flange sections 27a (left section in FIG. 2) is formed in advance when making the outer clutch-race 25, so it has the same thickness as that of the cylindrical portion of the outer clutch-race 25. On the other hand, the flange section 27b (right section in FIG. 2) is formed after the roller 26 and clutch retainer 28 (described below) have been assembled on the inside in the radial direction of the outer clutch-race 25, so it is thin in material thickness.

Moreover, a clutch retainer 28 is fit around the outside of the inner clutch-race 21 such that it is impossible for it to rotate with respect to the inner clutch-race 21. A plurality of rollers 26, which together with the inner clutch-race 21 and the outer clutch-race 25 form the roller clutch 10, are held by the clutch retainer 28 such that they can freely roll and also move a little in the circumferential direction. This clutch retainer 28 is made of synthetic resin or plastic (for example, a synthetic resin such as polyamide 66, polyamide 46 or polyphenylene sulfide that is mixed with about 20% glass fibers) and is formed generally into a cage-like cylindrical shape, and as partly shown in FIG. 4, this clutch retainer 28 comprises a pair of ring-shaped rim sections 29, and a plurality of column sections 30 that connect these rim sections 29.

The sections that are surrounded on four sides by the inside surfaces of the rim sections 29 and the surfaces in the circumferential direction of the column sections 30 form pockets 31 for holding the rollers 26, respectively, such that they can freely roll and also move a little in the circumferential direction. Also, as shown in FIG. 5, protrusions 32 are formed at a plurality of locations on the inner peripheral surface of the rim sections 29 while concave sections 23 are formed on the outer peripheral surface of the inner clutch-race 21, and the protrusions 32 are fitted with the concave sections 23, so that the clutch retainer 28 is attached such that it cannot rotate with respect to the inner clutch-race 21.

Moreover, a substantially cylindrical space is formed between the outer peripheral surface of the cam surface 22 and the inner peripheral surface (cylindrical surface) in the middle section of the outer clutch-race 25. As shown in FIG. 6, springs 33 are attached to one of the sides in the circumferential direction of the column sections 30 of the clutch retainer 28, respectively. These springs 33 that are attached to each of the column sections 30 elastically press the rollers 26, that are held in the pockets 31, in the same circumferential direction of the clutch retainer 28 toward the section having a narrow width in the radial direction (toward the right, or in the clockwise direction of FIG. 5), respectively. In the example shown in the figure, flat springs made of spring steel plate and bent on both ends in a substantially hook shape are used as the springs 33, however it is also possible to use synthetic resin springs that are formed together in a single piece with the clutch retainer 28.

Also, as to the flange sections 27a, 27b of the outer clutch-race 25, both of the ends in the axial direction of the clutch retainer 28 come very close to and face the inside surfaces of these flange sections 27a, 27b, and this prevents the clutch retainer 28 from moving in the axial direction. However, instead of this construction, another construction for preventing the clutch retainer from moving in the axial direction has been known, in which a plurality of stepped sections are formed around the outer peripheral surface of a shaft member such as a sleeve to fit with parts of the clutch retainer, such as disclosed in Japanese patent publications No. Tokukai Hei 11-22753, No. Tokukai 2001-165201, etc.

When using a pulley apparatus with built-in roller clutch that is constructed as described above and there is a tendency for the follower pulley 7 and sleeve 8 to relatively rotate to a specified direction, or in other words, when the follower pulley 7 tends to rotate relative to the sleeve 8 in the direction that the springs 33 push the rollers 26 (to the right or clockwise in FIG. 5), the rollers 26 bite into the sections having a narrow width in the radial direction in the substantially cylindrical space. Also, the follower pulley 7 cannot rotate relative to the sleeve 8 (this is called locked state). On the other hand, when the follower pulley 7 and sleeve 8 rotate in a direction opposite to the specified direction, or in other words, when the follower pulley 7 tends to rotate relative to the sleeve 8 in the direction (to the left or counterclockwise direction in FIG. 5) opposite the direction that the springs 33 push the rollers 26, the rollers 26 move against the elastic force of the springs 33 toward the sections having a large width in the radial direction in the substantially cylindrical space, and the follower pulley 7 can rotate freely relative to the sleeve 8 (this is called overrun state).

There are the following two reasons for using a pulley apparatus with built-in roller clutch constructed as described above in an alternator. The first reason is to increase the life of the endless belt. For example, when the drive engine is a diesel engine or direct-injection gasoline engine, there are large changes in rotation angle speed of the crankshaft when rotating at low rpm such as during idling. As a result, the running speed of the endless belt that runs around the follower pulley also changes small. On the other hand, rotation of the rotating shaft 3 of the alternator that is rotated and driven by the endless belt via the follower pulley does not change so suddenly due to the inertial mass of the rotating shaft 3 and the rotor etc. fixed to the rotating shaft 3. Therefore, when the follower pulley is simply fixed with respect to the rotating shaft, there is a tendency for friction to occur in both directions between the endless belt and follower pulley due to changes in the rotation angle speed of the crankshaft. As a result, stress is applied repeatedly in differing directions on the endless belt that rubs against the follower pulley, which makes it easy for slipping to occur between the endless belt and the follower pulley, or becomes the cause of decreased life of the endless belt.

Therefore, by using the pulley apparatus with built-in roller clutch described above as the follower pulley, when there is a tendency for the running speed of the endless belt to be fixed or to increase, the rotation force is freely transmitted from the follower pulley to the rotating shaft 3, and conversely, when there is a tendency for the running speed of the endless belt to decrease, the follower pulley rotates freely with respect to the rotating shaft. In other words, when there is a tendency for the running speed of the endless belt to decrease, the rotation angle speed of the follower pulley becomes slower than the rotation angle speed of the rotating shaft, so as to prevent strong rubbing from occurring at the area of contact between the endless belt and the follower pulley. In this way, the direction of the stress that acts on the section of rubbing between the endless belt and the follower pulley becomes constant, and it is possible to prevent slipping between the endless belt and the follower pulley, or to prevent a decrease in the life of the endless belt.

The second reason is to improve the power generating efficiency of the alternator. The drive engine of the automobile rotates and drives the rotating shaft 3, to which the alternator rotor is fixed, by way of the endless belt and follower pulley. When using a fixed type follower pulley and the rpm of the drive engine decreases suddenly, the rpm of the rotor also decreases suddenly, as well as does the amount of power generated by the alternator. However, when using a pulley apparatus with built-in roller clutch as described above as the follower pulley of the alternator, the rpm of the rotor decreases gradually due to inertial forces and power generation continues during this time, even though the rpm of the drive engine decreases suddenly. As a result, it is possible to more efficiently use the kinetic energy of the rotating shaft and rotor and to increase the amount of power generated by the alternator more than when using a fixed-type follower pulley.

The explanation above is made for the case of when the pulley apparatus with built-in roller clutch was located on the side of the follower pulley, however, similar function and effects can be obtained when a pulley apparatus with built-in roller clutch, having the same construction as described above, is located on the end of crankshaft on the drive side.

In the aforementioned documents that describe a prior art pulley apparatus with built-in roller clutch, including the prior art construction described above, the construction is capable of maintaining the durability and reliability of the pulley apparatus with built-in roller clutch, however there was nothing particularly mentioned about a method for more efficiently assembling this pulley apparatus with built-in roller clutch.

Taking this into consideration, it is an object of this invention to provide a pulley apparatus with built-in roller clutch that is sufficiently durable and reliable, and an assembly method that makes it possible to easily assemble that pulley apparatus with built-in roller clutch.

DISCLOSURE OF THE INVENTION

A feature of the pulley apparatus with built-in roller clutch and assembly method of this invention is that the pulley apparatus comprises a pulley member, a rotating shaft member (also called the shaft member), a roller clutch, a first ball bearing and a second ball bearing.

Of these, the pulley member has a substantially cylindrical shape such that an endless belt can freely run around its outer peripheral surface.

The rotating shaft member is located on the radially inner side of the pulley member such that it is concentric with the pulley member.

The roller clutch is located between the inner peripheral surface in the middle in the axial direction of the pulley member and the outer peripheral surface in the middle in the axial direction of the rotating shaft member, and transmits rotating force on only one direction between the pulley and the rotating shaft, or in other words, becomes locked in one direction of rotation, and becomes unlocked in the other direction.

This kind of roller clutch comprises an outer clutch-race-like section on the outer periphery, an inner clutch-race section on the inner periphery, a retainer, a plurality of rollers, a plurality of springs, a falling-prevention means, a fitting section and fitted section.

Of these, the outer clutch-race-like section is located on the inner periphery in the middle section in the axial direction of the pulley member.

Also, the inner clutch-race-like section is located on the outer periphery in the middle section in the axial direction of the rotating shaft member, and the outer peripheral surface of this inner clutch-race-like section is formed such that it is undulated around the circumferential direction, and this becomes a cam section or cam surface.

The retainer is located between the outer peripheral surface of the inner clutch-race-like section and the inner peripheral surface of the outer clutch-race-like section, and comprises a plurality of pockets.

The rollers are held in the retainer pockets such that they can roll and move freely in the circumferential direction of the retainer.

The springs are located between the rollers and the retainer, in other words, they fit in the retainer and push the rollers in the same circumferential direction with respect to the retainer.

The falling-prevention means is located in part of the retainer, and prevents the rollers that are held in the pockets from coming out of the pockets and dropping inside in the radial direction of the retainer.

Of the fitting and fitted sections, the fitting section is located on the inner peripheral surface on the retainer, and by fitting with the fitted section located on the inner clutch-race-like section, it prevent the retainer from rotating relative to the inner clutch-race-like section.

The first ball bearing is located between the inner peripheral section of one end in the axial direction of the pulley member, and the outer peripheral section of one end in the axial direction of the rotating shaft section, so as to support radial loads and axial loads that are applied between the pulley member and the rotating shaft member. The outer diameter section of the first ball bearing is located on the inner peripheral section of one end in the axial direction of the pulley member, and a first outer-raceway is formed around the inner peripheral surface of this outer diameter section. Moreover, the inner diameter section of the first ball bearing is located on the outer peripheral section of one end in the axial direction of rotating shaft member, and a first inner-raceway is formed around the outer peripheral surface of this inner diameter section. Furthermore, a plurality of first balls is located between the first inner-raceway and first outer-raceway such that they can roll freely.

The second ball bearing is located between the inner peripheral surface of the other end in the axial direction of the pulley member and the outer peripheral surface of the other end in the axial direction of the rotating shaft member, so as to support radial loads and axial loads that are applied between the pulley member and rotating shaft member. This second ball bearing comprises an outer bearing race that fits around the inner peripheral surface on the other end in the axial direction of the pulley member and an inner bearing race that fits around the outer peripheral surface on the other end in the axial direction of the rotating shaft member, and a plurality of second balls, which are located between a second outer-raceway that is formed around the inner peripheral surface of the outer bearing race and a second inner-raceway that is formed around the outer peripheral surface of the inner bearing race, such that they can roll freely. Also, the shaft unit, or in other words, the rotating shaft unit comprises the rotating shaft member and the inner bearing race.

Moreover, the rotating shaft unit has a plurality of stepped sections around its outer peripheral surface. By fitting two of these stepped sections with part of the retainer, displacement of the retainer in the axial direction is suppressed.

The rollers of the roller clutch, and/or the roller raceway on the outer clutch-race-like section are beveled at one end thereof in the axial direction. For example, one end in the axial direction of the roller raceway on the outer clutch-race-like section is beveled. This beveled surface becomes a guide surface when bringing the rollers close to the outer clutch-race-like section in the axial direction, and then facing the rollers in the circumferential direction and moving them at the same time against the elastic force of the springs with the inner peripheral surface of the outer clutch-race-like section and the cam surface of the inner clutch-race-like section, in order to place the outer clutch-race-like section around the rollers.

It is preferable that the total amount of bevel (width in the radial direction) of this beveled surface(s) be larger than the dimension needed for the rollers and outer clutch race-like section to overlap as seen from the axial direction. In other words, when the rollers and outer clutch-race-like section are seen in the axial direction in a state where the retainer and outer clutch-race-like section are arranged such that they are concentric, and where the phase in the circumferential direction is specified (state where together with bringing the part of the rolling surface of the rollers held in the retainer in contact with the inner peripheral surface of the inner clutch-race-like section, the rollers are pressed in the circumferential direction by the springs), the total amount of the bevel of the end in the axial direction of the rollers and the bevel of the end of roller raceway on the outer clutch-race-like section is greater than the dimension of overlap of the rollers and outer clutch-race-like section.

Furthermore, the assembly method for assembling the pulley apparatus with built-in roller clutch according to a feature of this invention is a method for assembling the pulley apparatus with built-in roller clutch described above, and first, the rollers are placed and held in the respective pockets of the roller clutch retainer, then when these rollers are pressed to one side in the circumferential direction of the pockets by the springs, the rollers together with the retainer are placed around the radially outer side of the inner clutch-race-like section to form an assembled unit.

Next, in order to assemble the outer clutch-race-like section of the roller clutch radially around the outside of the rollers and springs held by the retainer, the end of the outer clutch-race-like section is pressed radially over the outside of the rollers using the aforementioned beveled surface as a guide surface, or in other words, the outer clutch-race-like section is fitted onto or radially around the outside of the rollers held by the retainer by using the beveled surface, and the rollers are faced toward the cam surface formed around the outer peripheral surface of the inner clutch-race-like section and pressed inward in the radial direction by the inner peripheral surface of the outer clutch-race-like section. By fitting the rollers with the cam surface, the rollers are all moved at the same time in the circumferential direction against the elastic force of the springs, and the rollers are moved to a specified position in the circumferential direction between the inner peripheral surface of the outer clutch-race-like section and the outer peripheral surface of the inner clutch-race-like section, to form the aforementioned roller clutch.

After this roller clutch has been assembled between the inner peripheral surface in the middle section in the axial direction of the pulley member and the outer peripheral surface in the middle section in the axial direction of the rotating shaft member, the second ball bearing is assembled between the inner peripheral surface of the other end in the axial direction of the pulley member and the outer peripheral surface of the other end in the axial direction of the rotating shaft member.

Before assembling the second ball bearing, the first ball bearing is assembled between the inner peripheral section of one end in the axial direction of the pulley member and the outer peripheral section of one end in the axial direction of the rotating shaft member. The first ball bearing may be assembled before or after assembling the roller clutch.

The work of securing the second ball bearing that is assembled in the section between the inner peripheral surface of the other end in the axial direction of the pulley member and the outer peripheral surface of the other end in the axial direction of the rotating shaft member is performed by a method such as pressure fitting, crimping, welding or using adhesive.

In the case of the assembly method for assembling the pulley apparatus with built-in roller clutch according to another feature of this invention, after the aforementioned unit has been assembled, a jig is temporarily installed around the assembly to press the plurality of rollers of the assembly in the radially inward direction. Then, with the rollers pressed with this jig in the radial direction of the assembled unit and the springs simultaneously compressed by this jig, the outer diameter section of the roller clutch is assembled around this assembly, after which the second ball bearing is installed.

With the pulley apparatus with built-in roller clutch and assembly method of this invention, it is possible to maintain sufficient durability and reliability of the pulley apparatus, as well as make it possible to perform assembly more easily.

First, the function and effect that makes it possible to maintain sufficient durability and reliability is obtained by suppressing displacement of the retainer in the axial direction by fitting part of the retainer with a plurality of stepped sections formed around on the outer peripheral surface of the rotating shaft unit. In other words, since displacement of the retainer in the axial direction is suppressed by engagement between part of the retainer and the aforementioned stepped sections, the end surface in the axial direction of this retainer never comes in contact with any part of the outer clutch race and other parts that rotate together with the pulley member.

The retainer is assembled such that it is prevented from rotating relative to the inner clutch-race-like section that is fastened around the outer peripheral surface of the rotating shaft member. Therefore, the pulley member and the retainer rotate relative to each other when the roller clutch is in the overrun state (when the connection is broken). As a results, if the end surface in the axial direction of the retainer comes in contact with any part of the outer clutch race or the parts that rotate together with the pulley member, the temperature of the roller clutch rises due to friction heat caused by rubbing of the contact area during overrun. Also, when this temperature rise becomes severe, the grease inside the roller clutch will degrade and cause the roller clutch to lose any protection against seizure, and thus it becomes difficult to obtain sufficient durability.

On the other hand, in the case of the pulley apparatus with built-in roller clutch of this invention, there is no relative rotation of the retainer with respect to the rotating shaft unit during overrun while the retainer is prevented from displacement in the axial direction as mentioned above, so that strong rubbing between the surface of the retainer and the surface of the mating surface such as part of the outer clutch-race-like section is prevented during overrun, and thus it is possible to maintain durability by suppressing the occurrence of friction heat during overrun and preventing degradation of the grease. Moreover, since the retainer and inner clutch-race-like section are effectively prevented from moving in the axial direction, it is possible to prevent the rolling surface of the rollers held in the retainer from coming out in the axial direction from the cam surface formed around the outer peripheral surface of the inner clutch-race-like section. Therefore, it is possible to securely prevent edge loading from being applied to the rolling surfaces of the rollers as part of the rolling surfaces comes in contact with the edge of the end in the axial direction of the cam surface, and thus it is possible to prevent a decrease in the rolling contact fatigue life of these rolling surfaces and it is possible to improve the durability of these surfaces.

Simplification of assembly is made possible by using the falling-prevention means, and by forming the beveled surface.

First, the falling-prevention means prevents the rollers held in the pockets of the retainer from falling inside in the radial direction of retainer, so it is possible to more easily perform the work of inserting the inner clutch-race-like section radially on the inside of the rollers held in the pockets of the retainer beforehand. In other words, when there is no falling-prevention means, all or some of the rollers held in the pockets will greatly protrude or fall radially inside the retainer, making it difficult to insert the inner clutch-race-like section radially on the inside of the retainer. However, in the case of this invention, it is possible with the falling-prevention means to prevent the rollers from greatly protruding or falling radially inside the retainer when inserting the inner clutch race-like section, and thus it is possible to more easily perform the installation work. In other words, the retainer for the roller clutch of this invention is a single retainer that performs two positioning functions, or in other words, it prevents the rollers from greatly protruding or falling radially inside the retainer during assembly, and prevents the retainer itself from moving in the axial direction during operation, so that it is capable of simplifying the assembly work and maintaining the durability and reliability of the pulley apparatus.

Second, the work of fitting the outer clutch-race-like section around the outside of the rollers that are arranged around the inner clutch-race-like section can be performed even more easily by a beveled surface that is formed on at least one of the end section in the axial direction of the rollers, and the end section of the roller raceway on the outer clutch-race-like section. In other words, this beveled surface acts as a guide surface when bringing the outer clutch-race-like section close to the rollers in the axial direction in order to place the outer clutch-race-like section around the rollers, and it makes it easier to perform the work of fitting the end of this outer clutch-race-like section radially around the outside of the rollers. That is, after assembling the retainer, rollers and springs around the inner clutch-race-like section to form an assembled unit, when fitting the outer clutch-race-like section radially around the outside of the rollers, the beveled surface allows for the outer clutch-race-like section to be fitted radially around the outside of the rollers.

Moreover, when fitting the outer clutch-race-like section radially around the outside of the rollers in this way, the inner peripheral surface of this outer clutch-race-like section presses the rollers inward in the radial direction of the inner clutch-race-like section toward the cam surface formed around the outer peripheral surface of the inner clutch-race-like section. As a result, the cam surface moves the rollers at the same time in the circumferential direction against the elastic force of the springs. Furthermore, the rollers are moved to a specified position in the circumferential direction between the inner peripheral surface of the outer clutch-race-like section and the outer peripheral surface of the inner clutch-race-like section (for example, to the part of the concave section of the cam surface where the rollers come in contact with the inner peripheral surface of the outer clutch-race-like section and the outer peripheral surface of the inner clutch-race-like section at the same time), to form the roller clutch. Moving the rollers against the elastic force of the springs to a specified position in this way is performed for all of the rollers at the same time by the work of fitting the outer clutch-race-like section, so the work of assembling the roller clutch can be performed easily. Moving the rollers simultaneously by the cam surface in the circumferential direction against the elastic force of the springs in this way means that the rollers are moved to a specified position in the circumferential direction between the inner peripheral surface of the outer clutch-race-like section and the outer peripheral surface of the inner clutch-race-like section as described above. It is possible by moving the rollers to a specified position between both of the aforementioned peripheral surfaces in this way that rotating force is freely transmitted between the outer clutch-race-like section and inner clutch-race-like section.

In short, in the case of this invention, the falling-prevention means prevents the rollers from greatly protruding or falling radially inside the retainer, and thus makes it easier to perform the work of inserting the inner clutch-race-like section radially on the inside of the rollers. Together with this, by forming a beveled surface, the inclined surfaces of the plurality of concave sections of the cam surface move the rollers in the circumferential direction of the inner clutch-race-like section as the end of the roller raceway of the outer clutch-race-like section is pressed over the outer diameter section of the rollers, so as to move the rollers to a specified position. Therefore, there is no need for troublesome work when assembling the rollers and springs, such as compressing each of the springs individually, and thus it is possible to assemble the pulley apparatus with built-in roller clutch simply and efficiently.

To say again, in the case of this invention, through the function of the falling-prevention means that is formed on the retainer of the roller clutch, the rollers are kept from moving radially inside the retainer, and thus it becomes easier to insert the inner clutch-race-like section into the radially inner section of the retainer. Also, by using the beveled surface to fit the outer clutch-race-like section radially around the outside of the rollers, the springs are all compressed at the same time, and the rollers are all moved to their specified position at the same time. Therefore, the work of moving the rollers against the elastic force of the springs to a specified position, which up until now was very troublesome work to perform because of the plurality of rollers and springs, can be performed easily. In other words, in regards to the assembly of the rollers, springs and outer clutch-race-like section, the work of bringing the outer clutch-race-like section into contact with the rollers is also easy to perform, as well as is the work of simultaneously compressing the springs and moving the rollers to their specified position after they have been brought into contact.

BRIEF DESCRIPTION OF THE DRAWINGS

FIG. 9 is a view to show a bevel formed on the inner periphery of the end of the outer clutch race wherein (A) is an enlarged perspective view of a portion and (B) is a cross sectional view taken along the line IX—IX in (A).

FIG. 10 is a cross sectional view to show engagement between the outer clutch race and the bevel formed on the outer periphery at the and of the rollers.

FIG. 12 is a cross sectional brief view to show an example of the assembling process of the pulley apparatus with built-in roller clutch according to a first example of the embodiment of the present invention.

FIG. 23 is a cross sectional brief view to show a second example of the falling-prevention means for preventing the rollers from falling off radially inward from the pockets of the clutch retainer.

FIG. 24 is a cross sectional brief view to show a third example of the falling-prevention means for preventing the rollers from falling off radially inward from the pockets of the clutch retainer.

FIG. 25 is a cross sectional view to show a fourth example of the means for preventing the rollers from falling off radially inward from the pockets of the clutch retainer, where (A) is a cross sectional brief view, and (B) is a view taken from the lower side of (A) with the rollers removed.

DESCRIPTION OF THE PREFERRED EMBODIMENTS

Figure 1:
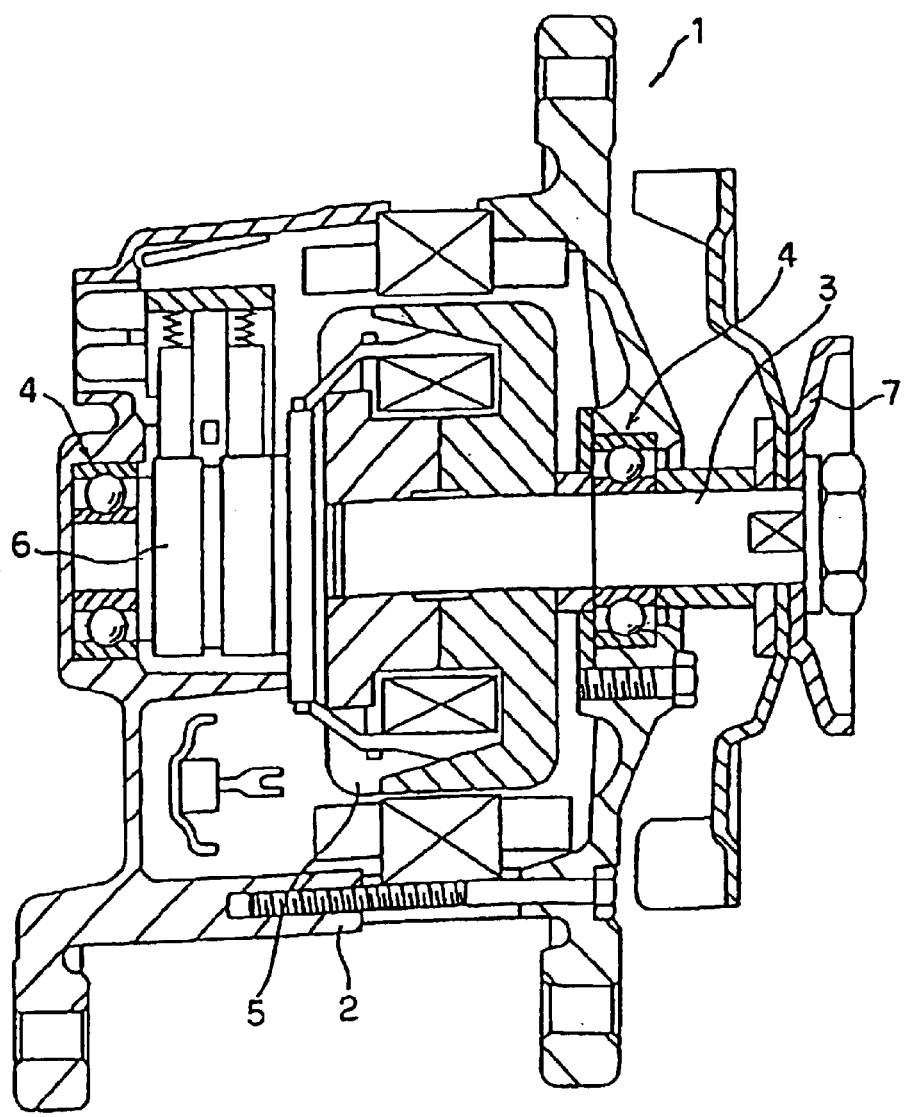
FIG. 1 is a cross sectional view to show an example of the conventional alternator.
Figure 2:
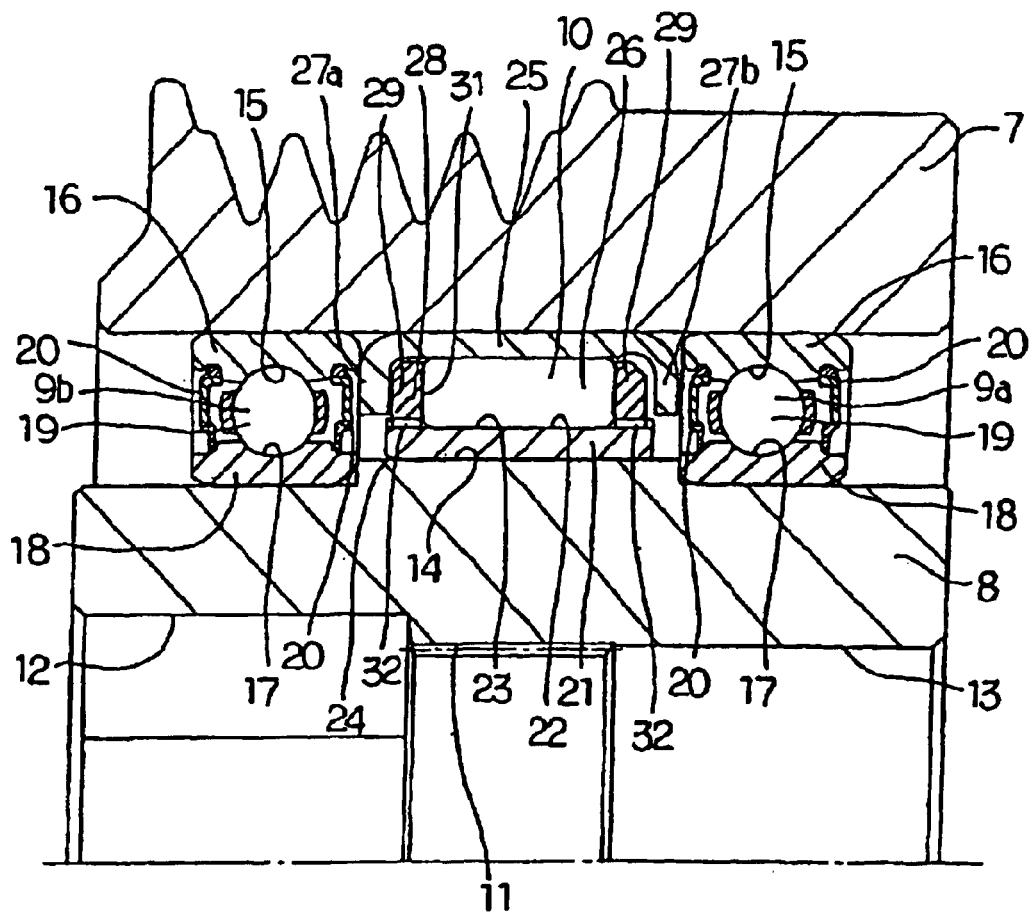
FIG. 2 is a cross sectional view of a half of an example of the conventional structure of the pulley apparatus with built-in roller clutch.
Figure 3:
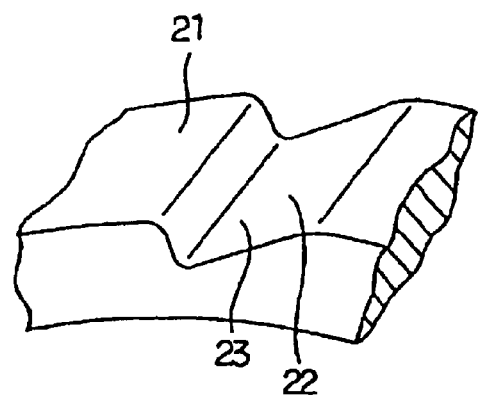
FIG. 3 is a perspective view of part of the inner clutch race.
Figure 4:
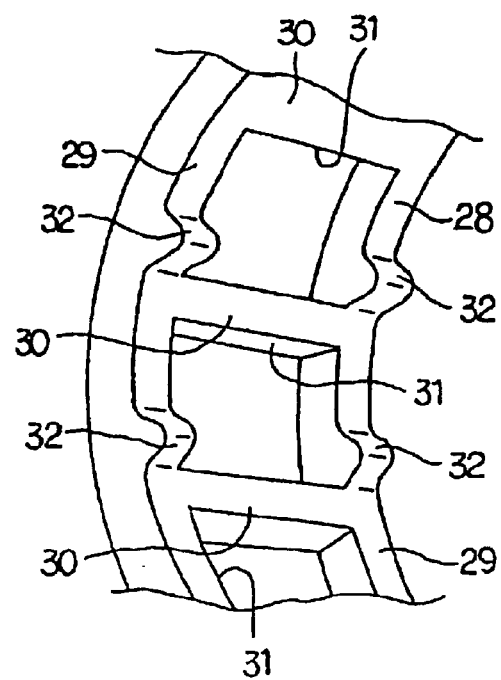
FIG. 4 is a perspective view of part of the clutch retainer.
Figure 5:
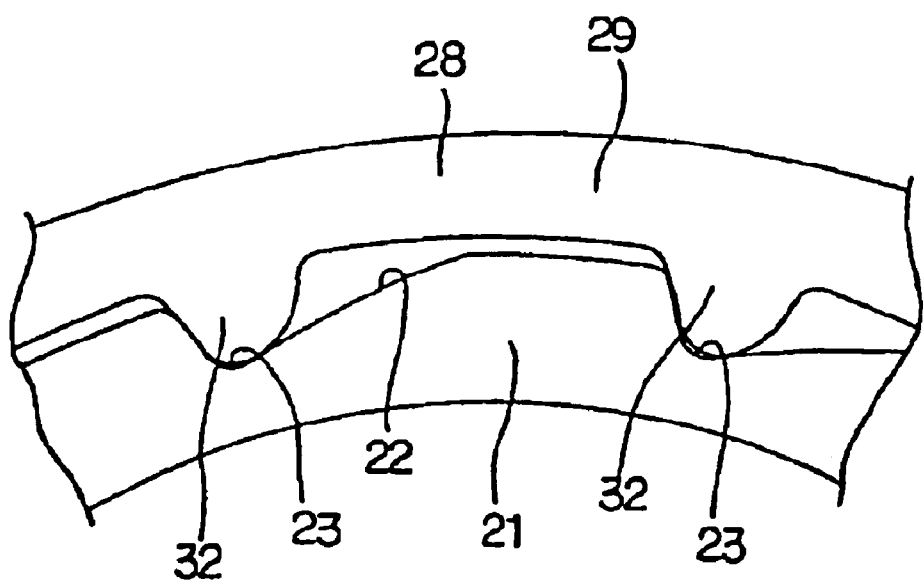
FIG. 5 is a side elevational view of part of the inner clutch race and the clutch retainer.
Figure 6:
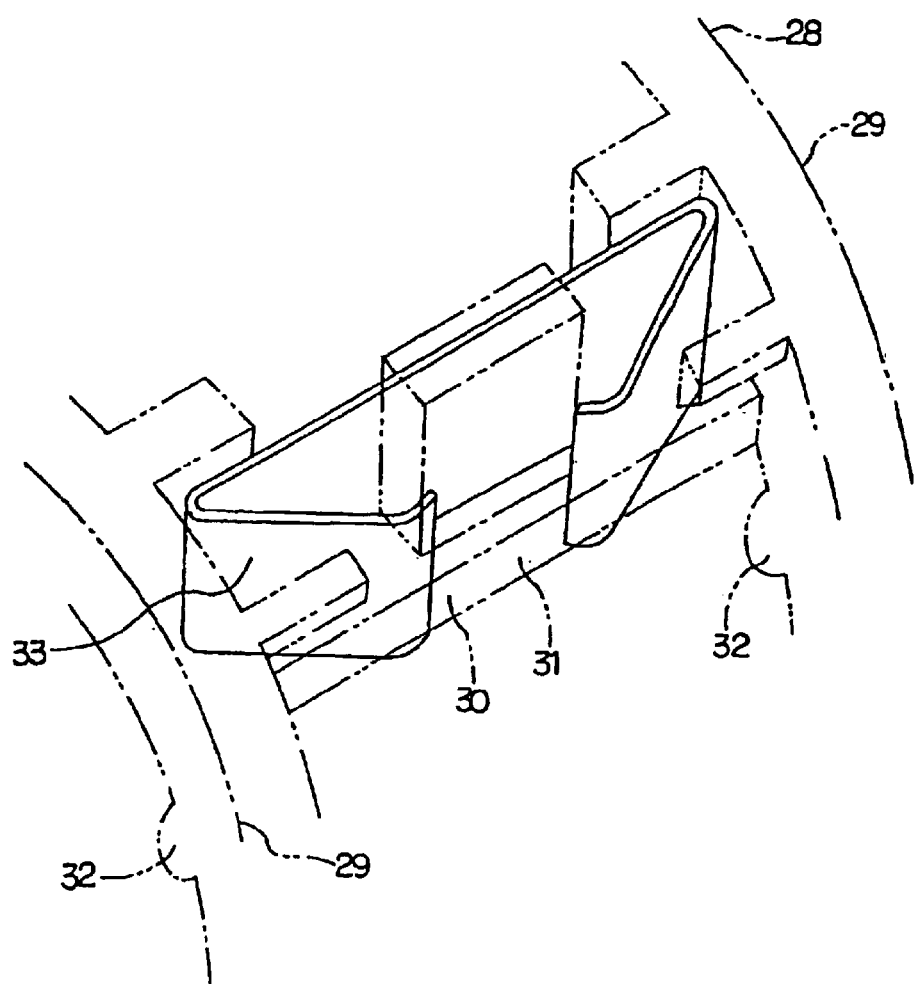
FIG. 6 is a perspective view of an example of the spring mounted to a clutch retainer.

FIGS. 7 to 11 show a first example of the embodiment of the invention. A feature of this invention is that it prevents rubbing between the clutch retainer 28 and the sections that rotate together with the follower pulley 7 during the overrun state to suppress any temperature rise due to friction heat, and thus improves durability, and it simplifies the work of assembling the roller clutch 10 radially on the inside of the follower pulley 7. The other construction and functions are substantially the same as those of the prior construction shown in FIGS. 2 to 6, so the same reference numbers will be given to identical parts and any redundant explanation of will be omitted. This explanation will center mainly on the features of this invention and those parts that differ from the prior art construction.

First, the construction of the part that suppresses displacement of the clutch retainer 28 in the axial direction in order to suppress a rise in temperature will be explained. This clutch retainer 28 is formed by injection molding of a synthetic resin having sufficient elasticity, and has a fitting brim section 34 in an inward facing flange shape that is formed all the way around or intermittently around the circumferential direction on one end in the axial direction (right end in FIG. 7). On the other hand, one or a plurality of fitting protrusions 35 that protrude inward in the radial direction are formed intermittently around in the circumferential direction of the other end in the axial direction of the clutch retainer 28. The inner peripheral surface of the fitting protrusions 35 is inclined outward in the radial direction toward the axial tip end and act as inclined guide surfaces 36. Also, stepped sections are formed on both ends in the axial direction of the inner clutch-race 21 of the roller clutch 10. Displacement in the axial direction of the clutch retainer 28 is suppressed by fitting both end surfaces in the axial direction of the inner clutch-race 21 with the fitting brim section 34 and the fitting protrusions 35 at their mating surfaces.

Figure 8:
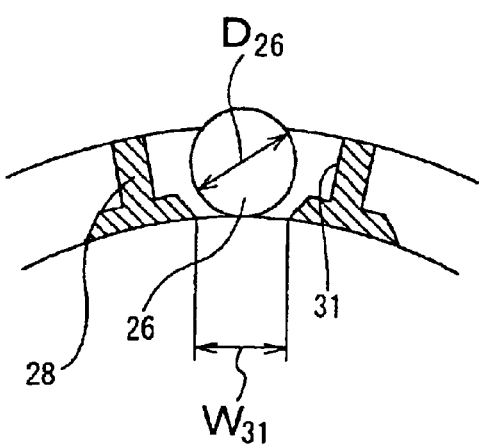
FIG. 8 is a cross sectional view of an example of the falling-prevention means to prevent the rollers from falling off radially inward from the pockets of the clutch retainer.

Next, FIG. 8 will be used to explain the falling-prevention means for preventing the rollers 26 from falling out of the pockets 31 of the clutch retainer 28 inward in the radial direction of the clutch retainer 28. As shown in FIG. 8, the rollers 26 are held in the pockets 31 formed in the clutch retainer 28 such that they can roll freely and move freely in the circumferential direction of the clutch retainer 28. Of the openings of the pockets 31, the width $W_{31}$ in the circumferential direction of the opening on the inner diameter side of the clutch retainer 28 is smaller than the diameter $D_{26}$ of the rollers ($W_{31} < D_{26}$). Therefore, the rollers 26 cannot pass through the openings on the inner-diameter side, and thus the rollers 26 do not fall inward in the radial direction of the clutch retainer 28.

Figure 11:
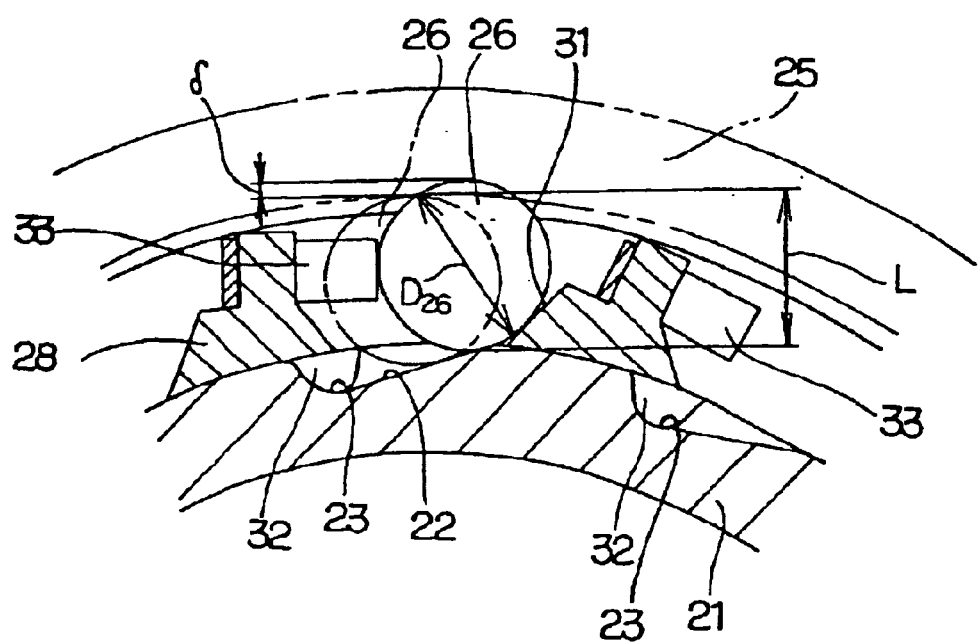
FIG. 11 is a view to show a state before pushing the inner clutch race on the radially inner side of the rollers, wherein the position relation between the inner clutch-race and the rollers is seen from the side of FIG. 7.

Next, FIGS. 9 to 11 will be used to explain the beveled surfaces that are formed on the radially inner edge section of one end in the axial direction of the outer clutch-race 25 and on the ends in the axial direction of the rollers 26 and that are used for installing the outer clutch-race 25 radially the outside of the rollers 26 that are held around the inner clutch-race 21 by the clutch retainer 28. First, as shown in FIGS. 9(A) and 9(B), a beveled surface 38 is formed all the way around circumference of the radially inner edge section of one end in the axial direction of the outer clutch-race 25 so as to connect the inner peripheral surface of the outer clutch-race 25 with the end surface 37 in the axial direction of this outer clutch-race 25. This beveled surface 38 forms bowl-shaped concave surface that is inclined outward in the radial direction from the inner peripheral surface of the outer clutch-race 25 toward the end surface 37.

Correspondingly, as shown in FIG. 10, beveled surfaces 39, which are convex surfaces having a quarter arc shaped or partially cone shaped cross section, are formed on the ends in the axial direction of the rollers 26.

These beveled surfaces 38, 39 act as guide surfaces for placing the outer clutch-race 25 around the rollers 26, or in other words, they act as guide surfaces for putting the rollers 26 radially on the inside of the outer clutch-race 25, specifically when bringing the outer clutch-race 25 close to the rollers 26 in the axial direction and using the cam surface 22 to move the rollers 26 in the circumferential direction against the elastic force of the springs 33. That is, when pressing the outer clutch-race 25 over the radially outer side of the rollers 26 in order to place the outer clutch-race 25 radially around the outside of the rollers 26, it is possible because of these beveled surfaces 38, 39 to fit the outer clutch-race 25 radially around the outside of the rollers 26 without any interference between the outer peripheral edges in the axial direction of the rollers 26 and the inner peripheral edge of the end in the axial direction of the outer clutch-race 25.

Therefore, the amount of bevel of these beveled surfaces 38, 39, or in other words, the total of the widths $W_{38}$, $W_{39}$ in the radial direction of these beveled surfaces 38, 39, is controlled by the relationship between the rollers 26 and the outer clutch-race 25. That is, in the first step of the work of fitting the outer clutch-race 25, the beveled end in the axial direction of the outer clutch-race 25 is placed around the mating ends of the rollers 26 that are held by the clutch retainer 28 around the outside of the inner clutch-race 21. In this first step, the rollers 26 and inner clutch-race 21 are still offset in the axial direction. Also, these rollers 26 are pressed by the springs 33, so that the phase in the circumferential direction is moved to the sections where the depths of the concave sections 23 of the cam surface 22 on the outer peripheral surface of the inner clutch-race 21 is shallow (sections where the space between the outer peripheral surface of the inner clutch-race 21 and inner peripheral surface of the outer clutch-race 25 is narrow).

In this state, as shown in FIG. 11, part of each roller 26 is located further outward in the radial direction than the inner peripheral surface of the outer clutch-race 25. Or in other words, part of the outer clutch-race 25 and part of each roller 26 overlap with each other in the radial direction, in other words when viewed in the axial direction. When the amount that these members 25, 26 overlap in this state is taken to be '$\delta$', then the total of the widths $W_{38}$, $W_{39}$ in the radial direction of the beveled surfaces 38, 39 is greater than the amount of overlap '$\delta$' ($W_{38} + W_{39} > \delta$). When this relationship ($W_{38} + W_{39} > \delta$) is achieved, either one of the widths $W_{38}$, $W_{39}$ can be zero '0'. By regulating the size of these beveled surfaces 38, 39 in this way, the outer clutch-race 25 can be freely radially fitted around the outside of the clutch retainer 28 and rollers 26 that were beforehand installed around the outer peripheral surface of the inner clutch-race 21.

The work of assembling the components of the pulley apparatus with built-in roller clutch of this example of the invention is performed, for example, as shown in FIGS. 12(A) to 12(F). First, as shown in FIG. 12(A), the springs 33 (see FIGS. 6 and 11) are mounted in the clutch retainer 28, and the rollers 26 are held in the pockets 31 that are formed in the clutch retainer 28. In this state, the springs 33 press the rollers 26 against one end in the circumferential direction of the pockets 31. Also, in this state, the rollers 26 are prevented from falling into the inner-diameter side of the clutch retainer 28 by the falling-prevention means as shown in FIG. 8. The rollers 26, springs 33 and clutch retainer 28 are installed radially around the outside of the inner clutch-race 21 as shown in FIG. 12(B). When doing this, the fitting protrusions 32 that are formed on the side of the clutch retainer 28 fits with the concave sections 23 formed on the inner clutch-race 21 to prevent relative rotation between the inner clutch-race 21 and clutch retainer 28 (see FIG. 11). Inserting the inner clutch-race 21 radially on the inner side of the clutch retainer 28 is performed from the side of the fitting protrusions 35 that are formed on the other end in the axial direction of the clutch retainer 28 (see FIG. 7). When performing the insertion, the fitting protrusions 35 are elastically deformed outward in the radial direction.

After that, as shown in FIG. 12(C), the outer clutch-race 25 is installed radially around the outside of the rollers 26. When installing the outer clutch-race 25, first, one end in the axial direction of the outer clutch-race 25 is pressed over (fitted onto) the outer diameter side of the rollers 26. When pressing the outer clutch-race 25 over the rollers 26, the beveled surfaces 38, 39 that are formed on the end in the axial direction of the outer clutch-race 25 and on the corresponding end of the rollers 26 (see FIGS. 9 and 10) act as guide surfaces. Therefore, pressing the outer clutch-race 25 radially over the outside of the rollers 26 can be performed smoothly with no trouble.

When starting the work of pressing (fitting) the outer clutch-race 25 in this way, the phase in the circumferential direction of the rollers 26 with respect to the inner clutch-race 21 is in the state as shown by the solid line in FIG. 11. In other words, the rollers 26 are located in the relatively shallow sections of the concave sections 23 of the cam surface 22 on the outer peripheral surface of the inner clutch-race 21, and the rollers 26 are located relatively outward in the radial direction of the inner clutch-race 21 by that amount. As can be clearly seen from FIG. 11, which shows this state, when the phase in the circumferential direction of the rollers 26 with respect to the inner clutch-race 21 is in that state, it is not possible to perform the work of fitting the outer clutch-race 25. The reason for that is, that in the section where the rollers 26 are located, the distance L between the inner peripheral surface of the outer clutch-race 25 and the cam surface 22 that is formed on the outer peripheral surface of the inner clutch-race 21 is less than the diameter $D_{26}$ of the rollers 26 ($L<D_{26}$).

However, as the outer clutch-race 25 is fitted radially around the outer diameter side of the rollers 26, the rollers 26 are moved in the circumferential direction against the elastic force of the springs 33 due to the cam surface 22 that is formed around the outer peripheral surface of the inner clutch-race 21. In other words, due to the interaction between the beveled surfaces 38, 39, as the end section in the axial direction of the outer clutch-race 25 moves over radially the outside of the rollers 26, the inner peripheral surface of the outer clutch-race 25 presses the rollers 26 against the outer peripheral surface of the inner clutch-race 21. Therefore, the rollers 26 receive a counter action from the outer peripheral surface of the inner clutch-race 21. Also, the rollers 26 are pressed in the orthogonal direction against the inclined surfaces of the concave sections 23 of the cam surface 22 formed around the outer peripheral surface of the inner clutch-race 21. Of the orthogonal force, the partial force in the circumferential direction of the inner clutch-race 21 moves the rollers 26 against the elastic force of the springs 33, as shown by the dashed line in FIG. 11, into a specified position in the circumferential direction between the inner peripheral surface of the outer clutch-race 25 and outer peripheral surface of the inner clutch-race 21, or in other words, into the section where the space between both of these peripheral surfaces is equal to the diameter $D_{26}$ of the rollers 26. In this state, the roller clutch 10 is completely assembled.

As shown in FIG. 12(D), the roller clutch 10 that is assembled in this way is installed around the inner peripheral surface in the middle section in the axial direction of the follower pulley 7 by interference-fitting the outer clutch-race 25 on the inside of the follower pulley 7. Then, as shown in FIG. 12(E), the inner clutch race 21 is interference-fitted around the outside of the sleeve 8 to install the inner clutch race 21 around the outer peripheral surface of the middle section in the axial direction of the sleeve 8. In this state, the roller clutch 10 is assembled between the inner peripheral surface in the middle section of the follower pulley 7 and the outer peripheral surface in the middle section of the sleeve 8.

Figure 7:
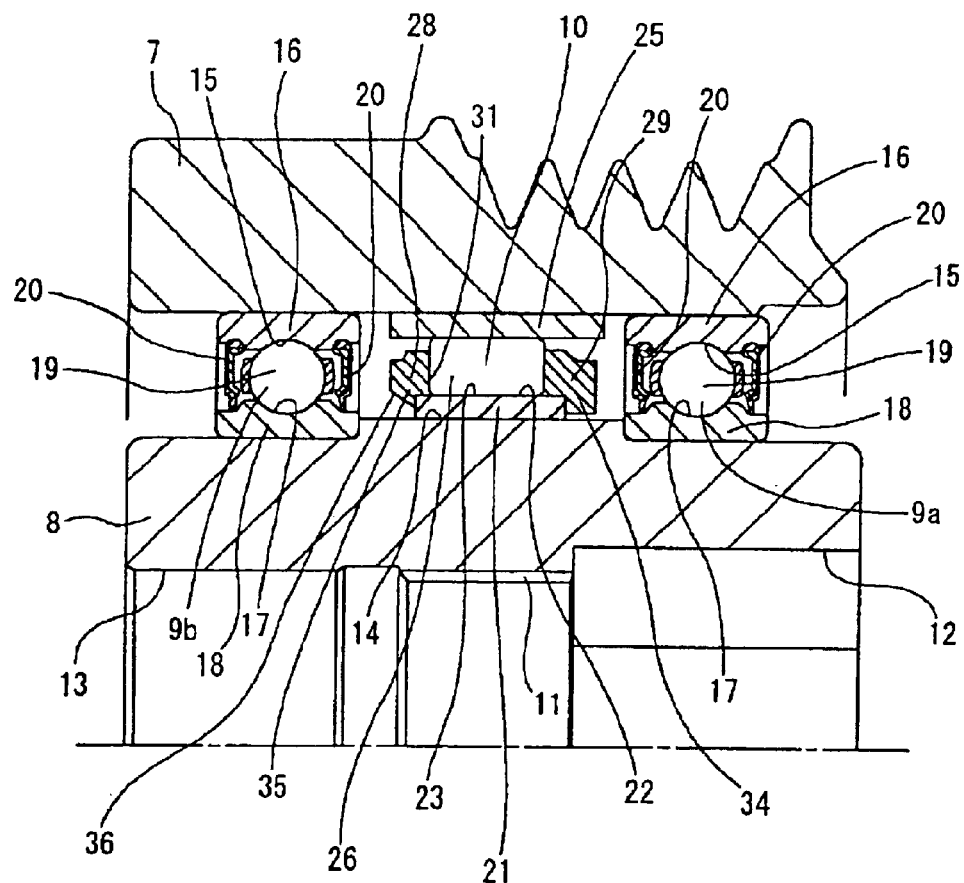
FIG. 7 is a cross sectional view of a half of an example of the embodiment of the pulley apparatus with built-in roller clutch of the present invention.

Finally, as shown in FIG. 12(F), the first and second ball bearings 9a, 9b are installed in the section between the inner peripheral surface of both end sections in the axial direction of the follower pulley 7 and the outer peripheral surface of both end sections of the sleeve 8 and located on both sides in the axial direction of roller clutch 10. In this state, the pulley apparatus with built-in roller clutch as shown in FIG. 7 is completely assembled.

The feature of the assembly method of this invention is in the process of assembling the outer clutch-race 25 around the outer diameter side of the clutch retainer 28, rollers 26 and springs 33 that were assembled beforehand radially around the outside of the inner clutch-race 21 in order to assemble the roller clutch 10. The other processes are not limited to the order shown in FIG. 12 and can be changed as appropriate. For example, it is possible to assemble clutch retainer 28, rollers 26, springs 33 and outer clutch-race 25 radially around the outside of the inner clutch-race 21 that has already been securely fitted and fastened beforehand radially around the outer peripheral surface of the middle section in the axial direction of the sleeve 8. Furthermore, one of the pair of ball bearings 9a, 9b may be installed between the inner peripheral surface of the follower pulley 7 and the outer peripheral surface of the sleeve 8 before assembling the roller clutch 10.

Figure 13:
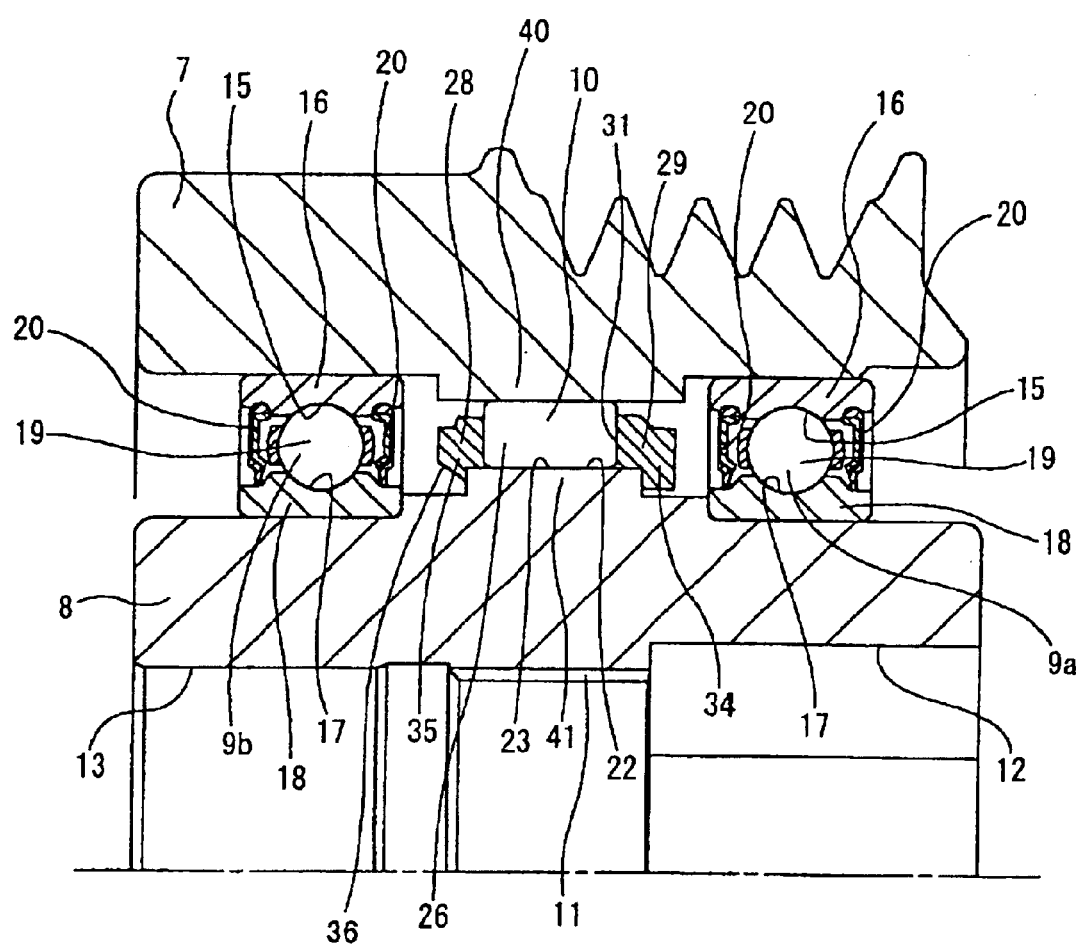
FIG. 13 is a cross sectional view of a half of a second example of the embodiment of the pulley apparatus with built-in roller clutch according to the present invention.

Next, FIG. 13 shows a second example of the embodiment of the invention. In this example, there are an outer clutch race-like section 40 of the roller clutch 10 integrated into a single member with the follower pulley 7, and an inner clutch-race-like section 41 integrated into a single member with the sleeve 8.

Figure 14:
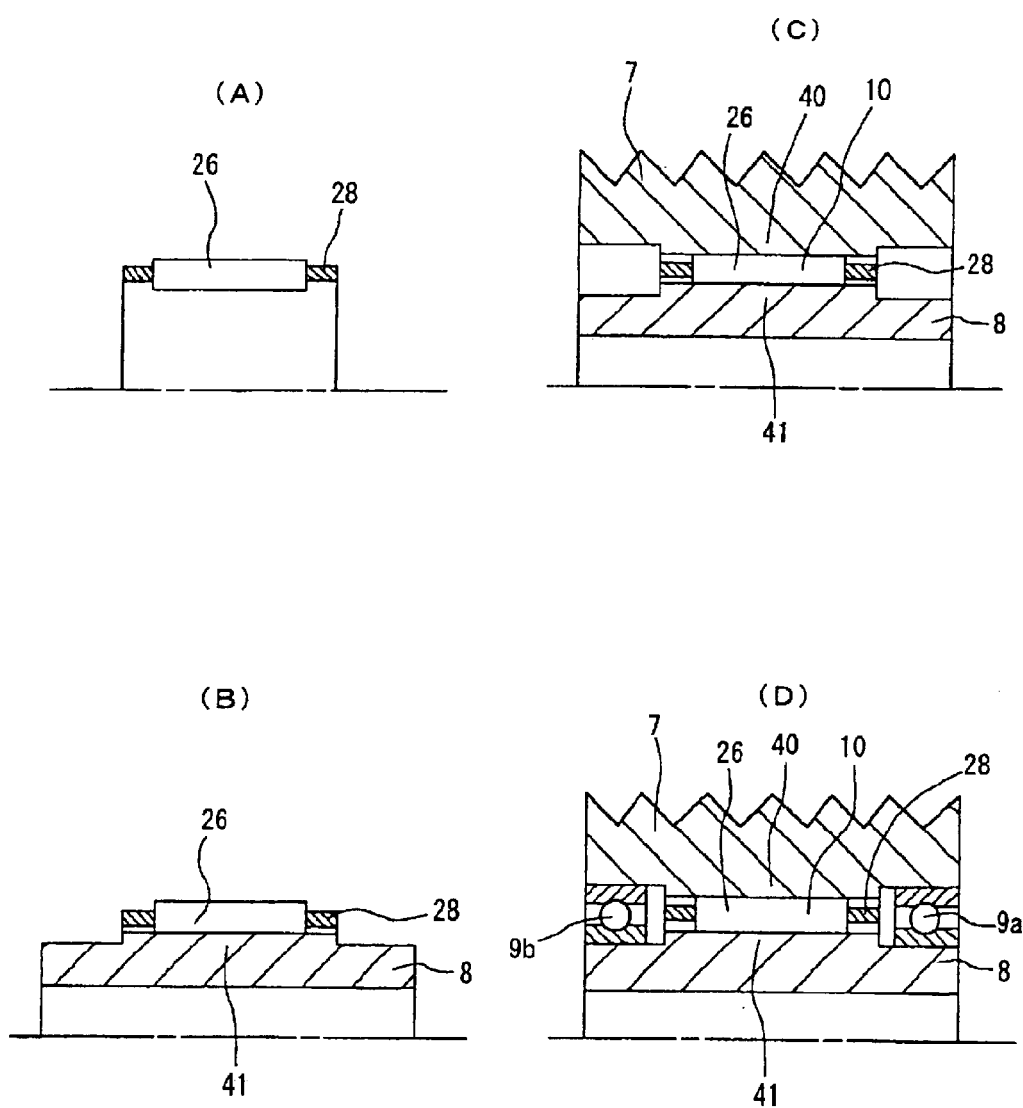
FIG. 14 is a cross sectional brief view of an example of the assembling process of the pulley apparatus with built-in roller clutch of a second example of the embodiment of the present invention.

As shown in FIG. 14(A), in the case of assembling the construction of this example, after the rollers 26 and springs have been assembled in the clutch retainer 28, these members are assembled radially around the outside of the inner clutch-race-like section 41 as shown in FIG. 14(B). Then, as shown in FIG. 14(C), the outer clutch-race-like section 40 is installed radially around the outside of the rollers 26 to form the roller clutch 10, and then the pair of ball bearings 9a, 9b are installed on both sides of the roller clutch 10 as shown in FIG. 14(D).

The construction and functions of the other parts are substantially the same as those in the first example described above, so any redundant drawings and explanations will are omitted.

Next, FIGS. 15 to 18 show a third thru sixth example of the embodiment of the invention.

Figure 15:
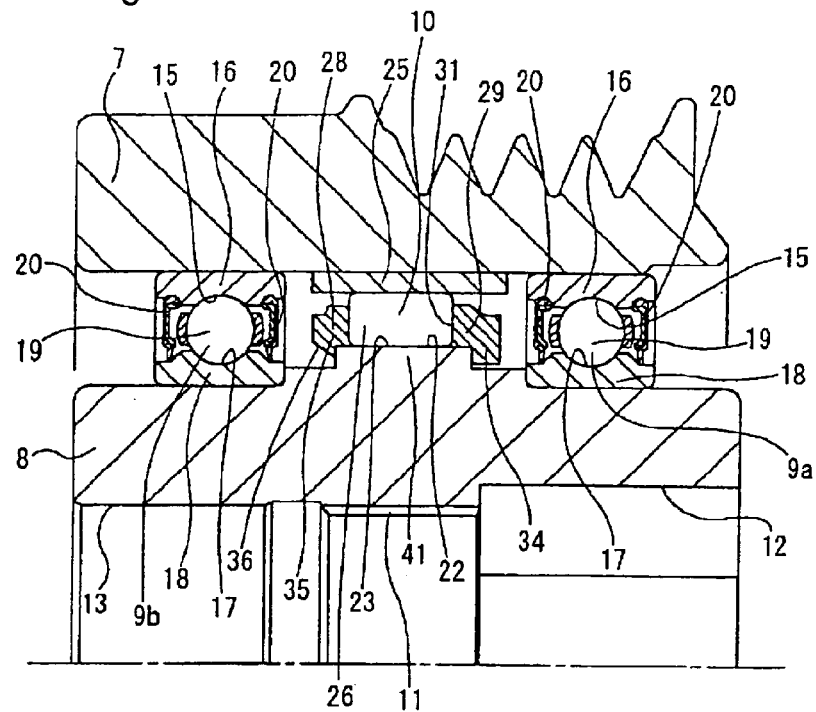
FIG. 15 is a cross sectional view of a half of a third example of the embodiment of the pulley apparatus with built-in roller clutch according to the present invention.

First, in the case of the third example shown in FIG. 15, the outer clutch-race 25 is fitted and fastened to the inner peripheral surface in the middle section in the axial direction of the follower pulley 7, and the inner clutch-race-like section 41 is integrally formed around the outer peripheral surface in the middle section in the axial direction of the sleeve 8.

Figure 16:
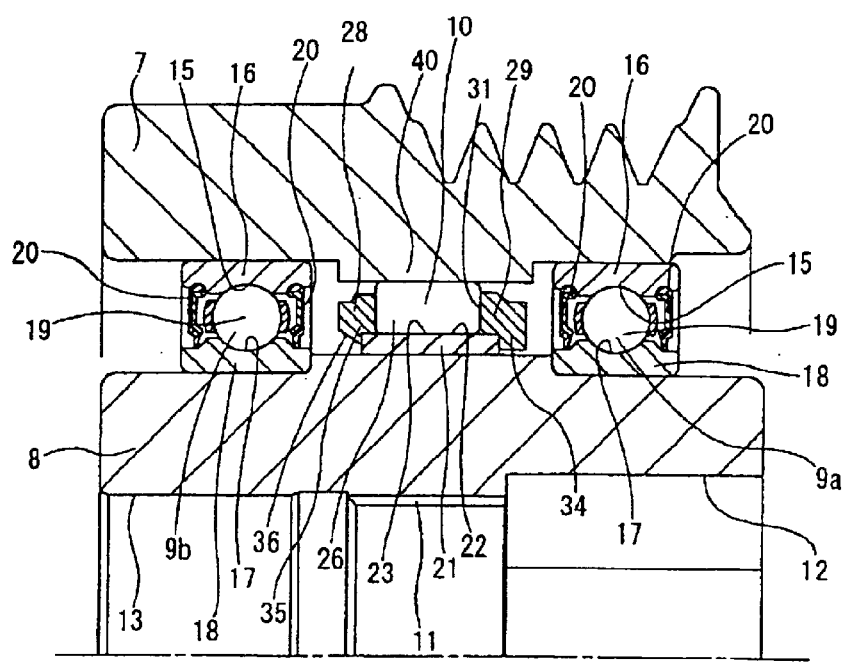
FIG. 16 is a cross sectional view of a half of a fourth example of the embodiment of the pulley apparatus with built-in roller clutch according to the present invention.

Next, in the case of the fourth example shown in FIG. 16, the inner clutch race 21 is fitted and fastened onto the outer peripheral surface in the middle section in the axial direction of the sleeve 8, and the outer clutch-race-like section 40 is integrally formed around the inner peripheral surface in the middle section in the axial direction of the follower pulley 7.

Figure 17:
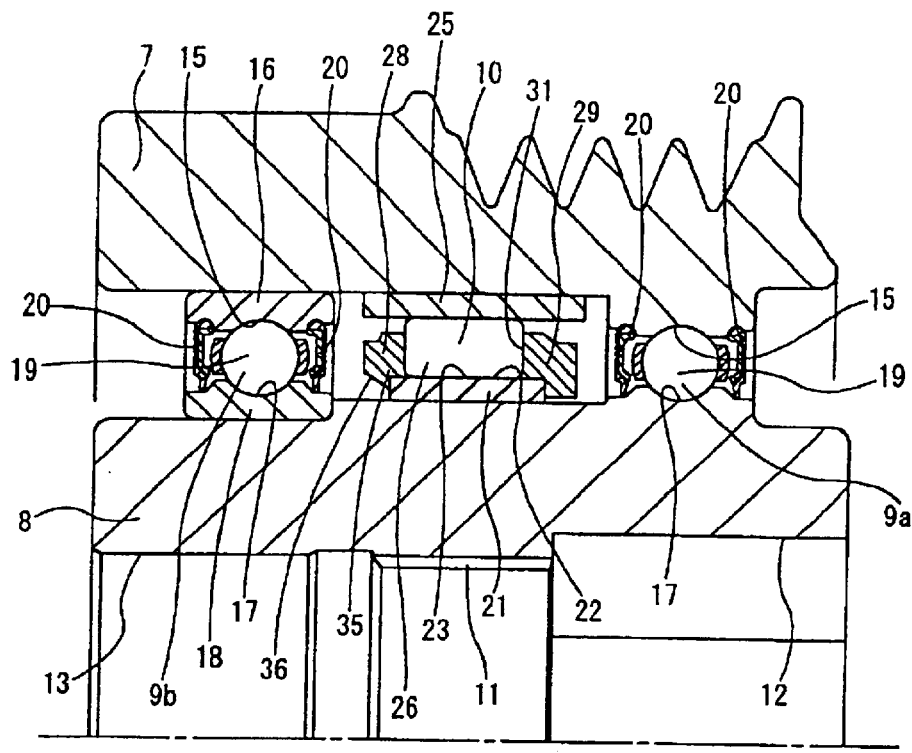
FIG. 17 is a cross sectional view of a half of a fifth example of the embodiment of the pulley apparatus with built-in roller clutch according to the present invention.

Next, in the case of the fifth example shown in FIG. 17, the sleeve 8 integrally has a member corresponding to the inner race of the first ball bearing 9a, and the follower pulley 7 integrally has a member corresponding to the outer race.

Figure 18:
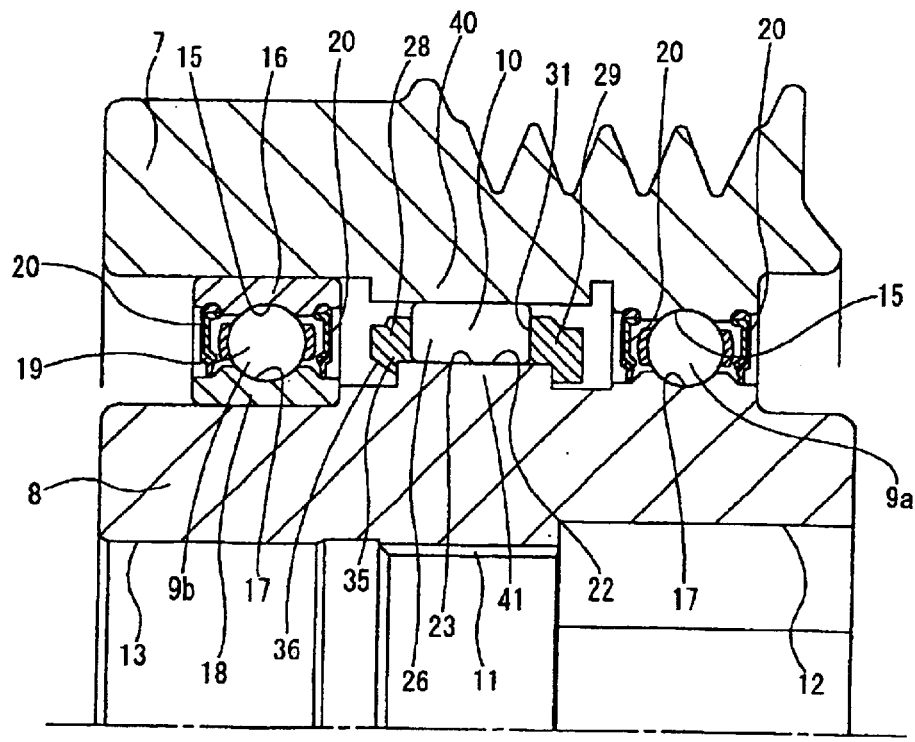
FIG. 18 is a cross sectional view of a half of a sixth example of the embodiment of the pulley apparatus with built-in roller clutch according to the present invention.

Furthermore, in the case of the sixth example shown in FIG. 18, the outer clutch-race-like section 40 of the roller clutch 10 is integrated with the follower pulley 7 while the inner clutch-race-like section 41 is integrated with the sleeve 8, and further the sleeve 8 has integrally a member corresponding to the inner race of the first ball bearing 9a while the follower pulley 7 has integrally a member corresponding to the outer race.

The construction and functions of the other parts of the third to sixth embodiments are substantially the same as those of the first and second embodiment described above and any redundant drawings or explanations are omitted.

Figure 19:
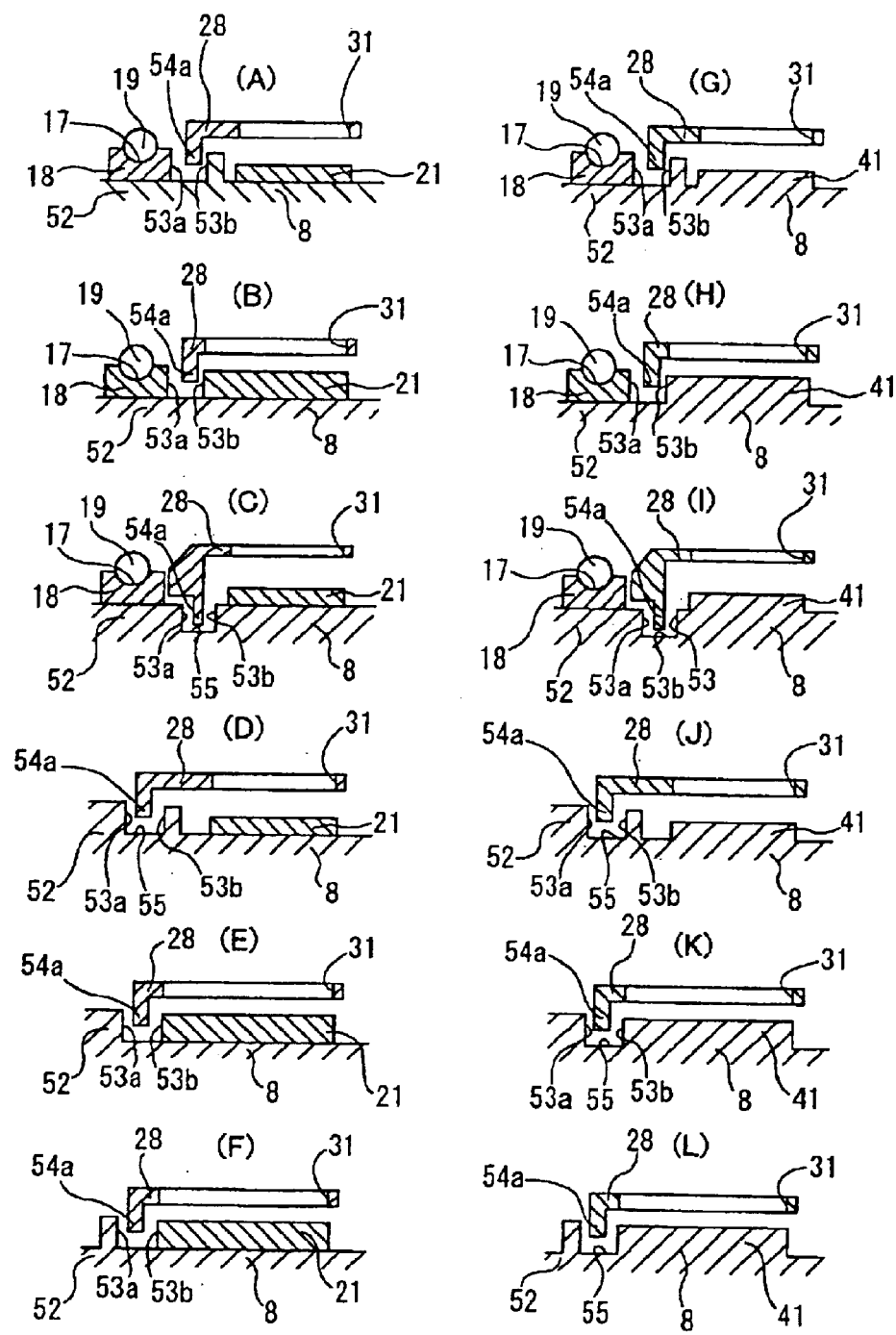
FIG. 19 is a cross sectional brief view of another twelve examples of the structure to prevent displacement in the axial direction of the clutch retainer.
Figure 20:
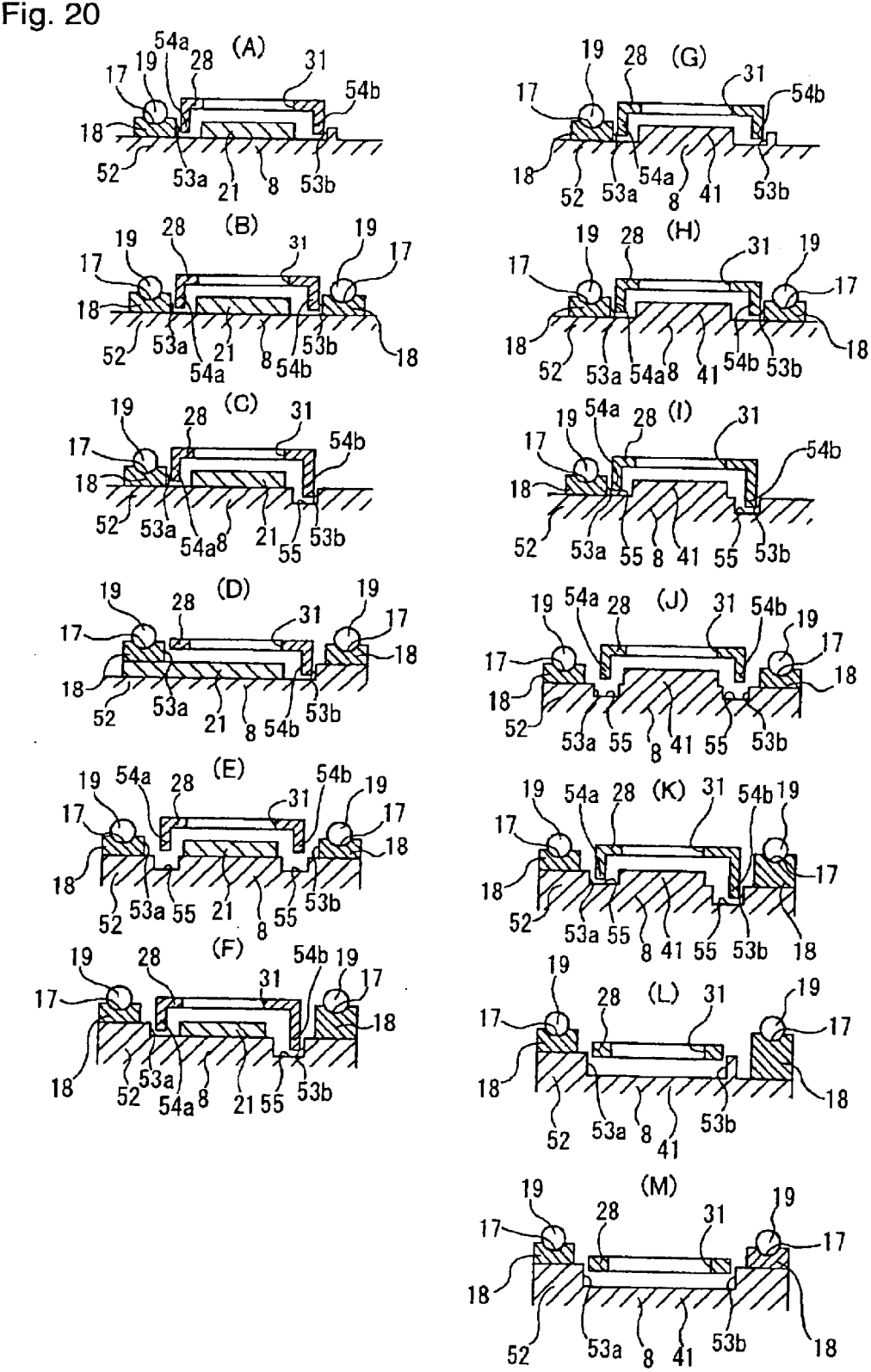
FIG. 20 is a cross sectional brief view of another thirteen examples of the structure to prevent displacement in the axial direction of the clutch retainer.
Figure 21:
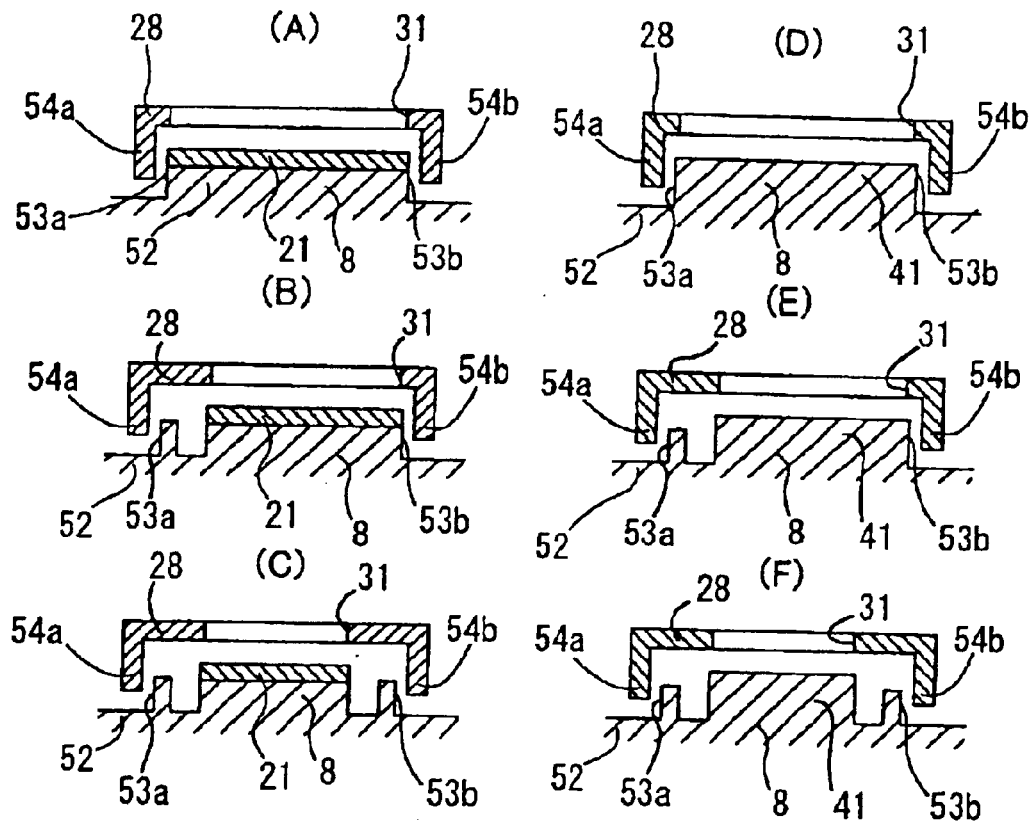
FIG. 21 is a cross sectional brief view of another six examples of the structure to prevent displacement in the axial direction of the clutch retainer.

Next, FIGS. 19 to 21 are used to explain other examples of the construction of the part that suppresses displacement in the axial direction of the clutch retainer 28 by fitting with part of the clutch retainer 28 a plurality of stepped sections 53a, 53b, which are formed around the outer peripheral surface of the rotating shaft unit 52 that is made by fastening or integrating the inner race 18 of at least one of the ball bearings 9a, 9b around the outside of the rotating shaft member 8. The stepped sections that are formed around the outer peripheral surface of the rotating shaft unit 52 include, of course the protruding stepped sections that are formed directly on the outer peripheral surface of the rotating shaft unit 52 {for example, the stepped section 53b as shown in FIG. 19(A)}, as well as the side surfaces of the concave groove 55 that is formed around the outer peripheral surface of the rotating shaft member 8 {for example, surfaces 53a, 53b shown in FIG. 19(C)}, and the end surfaces in the axial direction of the inner clutch-race 21 (inner clutch-race-like section 41), which is fitted and fastened around the outside of the rotating shaft member 8, and of the inner bearing races 18 of the ball bearings 9a, 9b {for example, surface 53b shown in FIG. 19(B)}.

Figure 22:
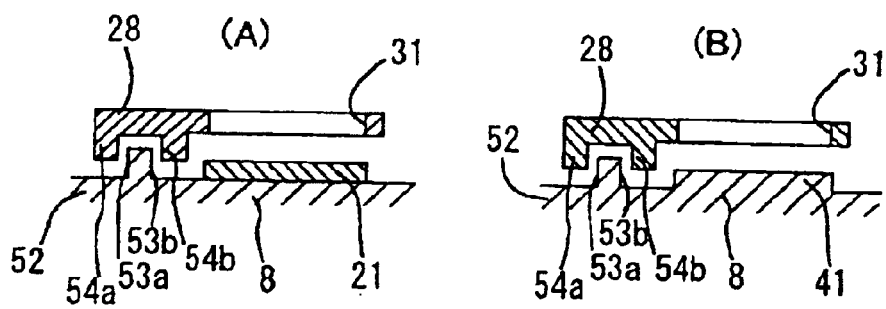
FIG. 22 is a cross sectional brief view of another two examples of the structure to prevent displacement in the axial direction of the clutch retainer.

Of the construction that uses these stepped sections 53a, 53b for suppressing displacement in the axial direction of the clutch retainer 28, FIGS. 19(A) to 19(L) show construction where a fitting section 54 that is bent inward in the radial direction from one end in the axial direction of the clutch retainer 28 is placed between a pair of stepped sections 53a, 53b, FIGS. 20(A) to 20(M) show construction where both ends in the axial direction of the clutch retainer 28 (including a fitting section 54 that is bent inward in the radial direction from the ends) are placed between a pair of stepped sections 53a, 53b, FIGS. 21(A) to 21(F) show construction where a pair of stepped sections 53a, 53b are located between a pair of fitting sections 54a, 54b that bend inward in the radial direction from both ends in the axial direction of the clutch retainer 28, and FIGS. 22(A) and 22(B) show construction where stepped sections 53a, 53b are located between a pair of fitting sections 54a, 54b that are formed on one end in the axial direction of the clutch retainer 28 to protrude inward in the radial direction.

Next, FIGS. 23 to 29 will be used to explain other examples of the construction of the falling-prevention means for preventing the rollers 26 that are held in the pockets 31 of the clutch retainer 28 from falling from the pockets 31 into the inner diameter side of the clutch retainer 28.

First, FIG. 23 shows construction where a spring 33 applies an elastic force on the roller 26 in the radial direction of the clutch retainer 28 and presses the roller 26 against the inclined surface 42 of the inner surface of the pocket 31.

FIG. 24 shows construction where protruding tabs 43a, 43b are formed on the opening section of the inner diameter side of the pocket 31 such that the distance between the tips of both of these tabs 43a, 43b is less than the diameter of the roller 26.

FIG. 25 shows construction where a filament-shaped wire 44 is located in the pocket 31 on the inner diameter side of the clutch retainer 28 such that it runs across in the axial direction of the pocket 31, such that the distance between this wire 44 and the opposing surface of the pocket 31 is less than the diameter of the roller 26.

Figure 26:
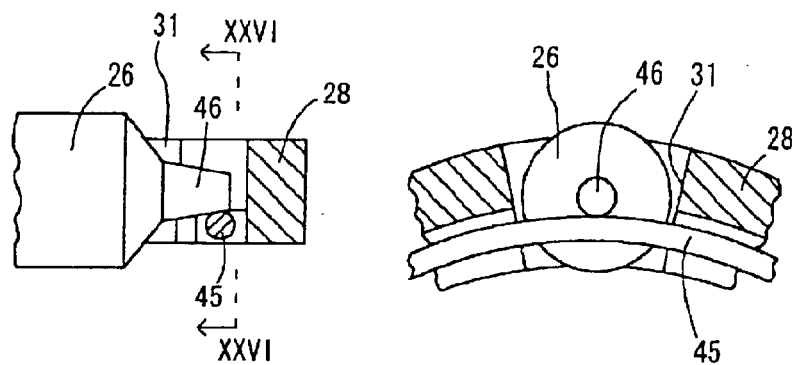
FIG. 26 is a cross sectional view to show a fifth example of the means for preventing the rollers from falling off radially inward from the pockets of the clutch retainer, where (A) is a cross sectional brief view, and (B) is a cross sectional view taken along the line XXVI—XXVI in (A).

FIG. 26 shows construction where wire rings 45 are mounted to the inner peripheral surface on both ends of the clutch retainer 28 and protrusions 46 are formed on both ends of the roller 26 such that the interaction between the wire rings 45 and the protrusions 46 prevents the roller 26 from moving inward in the radial direction of the clutch retainer 28.

Figure 27:
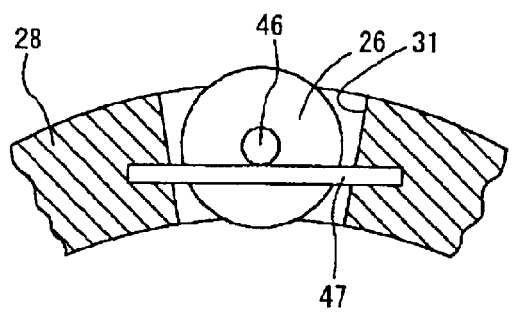
FIG. 27 is a cross sectional view to show a sixth example of the falling-prevention means for preventing the rollers from falling off radially inward from the pockets of the clutch retainer.

FIG. 27 shows construction where protrusions 46 are formed on the ends in the radial direction of the roller 26, and the filament-shaped wires 47 are engaged with the protrusions 46 and embedded into the ends in the axial direction of the clutch retainer 28.

Figure 28:
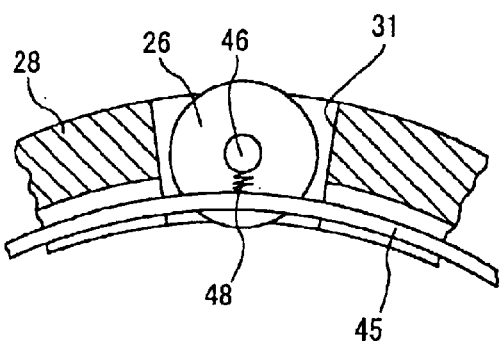
FIG. 28 is a cross sectional brief view to show a seventh example of the falling-prevention means for preventing the rollers from falling off radially inward from the pockets of the clutch retainer.

FIG. 28 shows construction where springs 48 are located between the wire rings 45 and protrusions 46 in the example shown in FIG. 26 such that they apply an elastic force on the roller 26 outward in the radial direction of the clutch retainer 28.

Figure 29:
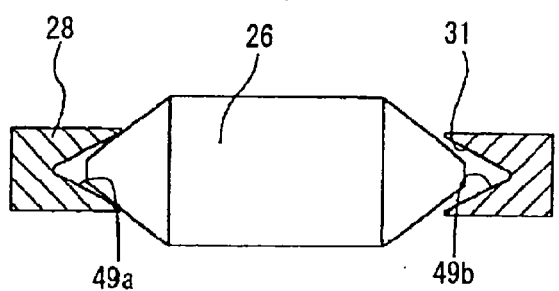
FIG. 29 is a cross sectional brief view to show an eighth example of the falling-prevention means for preventing the rollers from falling off radially inward from the pockets of the clutch retainer.

FIG. 29 shows construction where concave sections 49a, 49b are formed on the inner surface on both sides in the axial direction of the pockets 31 formed in the clutch retainer 28 such that both of the pointed ends in the axial direction of the roller 26 fit inside these concave sections 49a, 49b.

Figure 30:
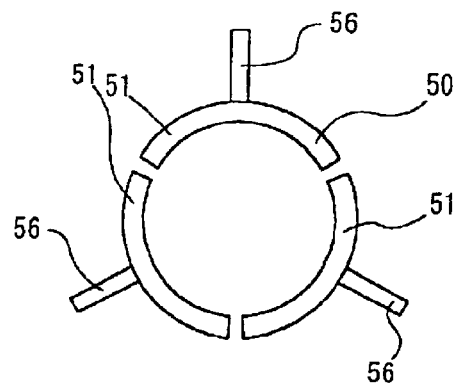
FIG. 30 is a side elevational brief view of a first example of the jig for use in working an embodiment of the present invention.
Figure 31:
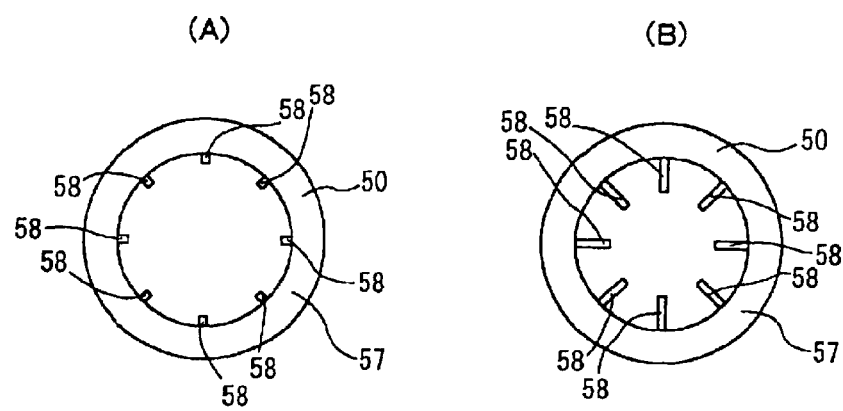
FIG. 31 is a side elevational brief view of a second example of the jig for use in working an embodiment of the present invention to show both of operating and non-operating conditions.
Figure 32:
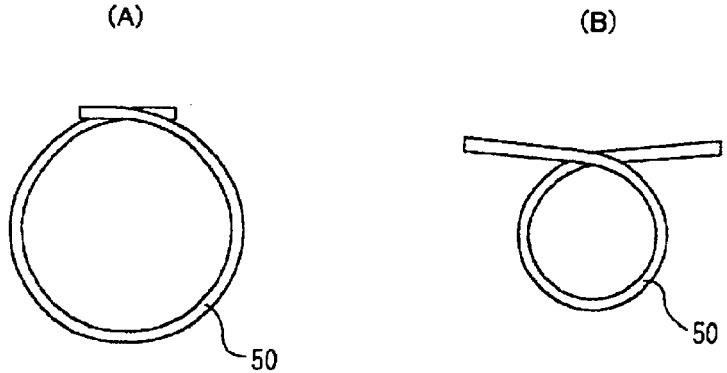
FIG. 32 is a side elevational brief view of a third example of the jig for use in working an embodiment of the present invention to show both of operating and non-operating conditions.

When performing the assembly method for the pulley apparatus with built-in roller clutch of this invention, before pressing the outer clutch-race-like section radially over the outside of the rollers, a jig 50, such as shown in FIGS. 30 to 32, is used to move the rollers, at the same time while pressing the springs, to a specified position in the circumferential direction of the retainer where the diameter of the circumscribed circle of the rollers is less than the inner diameter of the outer clutch-race-like section, such that the outer clutch-race-like section can be installed radially around the outside of the rollers.

Of the jigs 50 that are used in this case, the jig 50 shown in FIG. 30 moves a plurality (three in the figure) of circular-arc shaped pressure pieces 51 in the radial direction by rods 56. When fitting the outer clutch-race-like section over the rollers, the pressure pieces 51 press the rollers on their one half in the axial direction inward in the radial direction toward the inner clutch-race-like section, while at the same time the outer clutch-race-like section is fitted radially around the outside of the rollers from the other half in the axial direction. In this state, with the outer clutch-race-like section fitted over the rollers on the other half in the axial direction, the jig 50 is retracted (removed) and then the outer clutch-race-like section is fitted over the one half in the axial direction of the rollers.

The jig 50 shown in FIGS. 31(A) and 31(B) has a circular-shaped holder 57 that supports the same number of pressure rods 58 as the rollers such that they can move freely in the radial direction. When fitting the outer clutch-race-like section over the rollers, the holder 57 is placed over one half in the axial direction of the rollers, and then by moving the pressure rods 58 inward in the radial direction from the state shown in FIG. 31(A) to the state shown in FIG. 31(B), it presses the one half in the axial direction of the rollers inward in the radial direction of the inner clutch-race-like section, while at the same time the outer clutch-race-like section is fitted radially around the outside of the rollers from the other half in the axial direction of the rollers. In this state, with the outer clutch-race-like section fitted over the rollers on the other half in the axial direction, the jig 50 is retracted (removed) and then the outer clutch-race-like section is fitted over the one half in the axial direction of the rollers.

Furthermore, the jig 50 shown in FIGS. 32(A) and 32(B) is a flexible cord-shaped jig, and when fitting the outer clutch-race-like section over the rollers, the jig 50 is placed over one half in the axial direction of the rollers and transformed from the state shown in FIG. 32(A) to the state shown in FIG. 32(B), so that the one half in the axial direction of the rollers is pressed inward in the radial direction of the inner clutch-race-like section, while at the same time the outer clutch-race-like section is fitted radially over the rollers from the other half in the axial direction of the rollers. In this state, with the outer clutch-race-like section fitted over the rollers on the other half in the axial direction of them, the jig 50 is removed and then the outer clutch-race-like section is fitted over the one half in the axial direction of the rollers.

When performing the assembly work using a jig 50 as described above, there is no need to form beveled surfaces on the ends in the axial direction of the rollers arid around the radially inner edge of one end surface in the axial direction of the outer clutch-race-like section. (The beveled surfaces are not necessary but there is no problem if they are formed.)

Industrial Applicability

This invention is constructed and functions as described above, and provides a pulley apparatus with built-in roller clutch and assembly method thereof, that makes it possible to maintain durability and reliability of the pulley apparatus, as well as makes it possible to perform the assembly process more easily.

What is claimed is:

1. A method of assembling a pulley apparatus with built-in roller clutch for use in belt transmission of an auxiliary machinery of an engine, the pulley apparatus comprising a pulley member, a shaft member provided on the radially inner side of the pulley member, a first ball bearing provided between the pulley member and the shaft member on one side in the axial direction thereof, a second ball bearing provided between the pulley member and the shaft member on the other side in the axial direction thereof, and a roller clutch provided between the pulley member and the shaft member, a. the first ball bearing comprising an outer diameter section provided in the inner peripheral portion of the pulley member and having a first outer raceway in the inner peripheral surface thereof, an inner diameter section provided in the outer peripheral portion of the shaft member and having a first inner raceway in the outer peripheral surface thereof, and a plurality of first balls provided between the first inner raceway and the first outer raceway, b. the second ball bearing comprising an outer race separated from the pulley member, fitted into the inner peripheral surface of the pulley member and having a second outer raceway in the inner peripheral surface thereof, an inner race fitted onto the outer peripheral surface of the shaft member to cooperate with the shaft member to form a shaft member unit and having a second inner raceway in the outer peripheral surface thereof, and a plurality of second balls provided between the second inner raceway and the second outer raceway, c. the roller clutch adapted to be locked in one of the rotation directions and unlocked in the other of the rotation directions, and comprising an outer diameter section provided in the inner peripheral portion of the pulley member, an inner diameter section provided in the outer peripheral portion of the shaft member and having a cam portion on the outer peripheral surface thereof, a plurality of rollers provided between the outer peripheral surface of the inner diameter section and the inner peripheral surface of the outer diameter section, a retainer provided between the outer diameter section and the inner diameter section and having pockets to hold the rollers on the inside thereof, respectively, and a plurality of springs engaged with the retainer to press the rollers, respectively, d. the retainer of the roller clutch having a falling-prevention means for preventing the rollers from falling off, e. the outer diameter section of the roller clutch having a roller raceway on the inner peripheral surface thereof, f. the shaft member unit having a plurality of step portions two of which are used to form a means to regulate displacement in the axial direction of the retainer of the roller clutch, g. at least one of the rollers and the roller raceway in the outer diameter section of the roller clutch being formed with a bevel at one end thereof to compress the springs simultaneouly, h. the method comprising of holding the rollers in the pockets in the retainer of the roller clutch and pressing the rollers with the springs engaged with the retainer, respectively, thereby forming an assembly with the retainer installed on the outer diameter side of the inner diameter section of the roller clutch, i. then, simultaneously compressing the springs while utilizing the bevel to insert the outer diameter section of the roller clutch over the rollers in the assembly, and j. then, mounting the plurality of second balls to between the inner peripheral surface of the pulley member and the outer peripheral surface of the shaft member.

2. A method of assembling a pulley apparatus with built-in roller clutch of claim 1, wherein in the state where the retainer of the assembly is coaxially combined with the outer diameter section of the roller clutch, the total amount of a width of the bevel at the end of the rollers and a width of the bevel at the end of the roller raceway of the outer diameter section is larger than the amount by which the rollers project toward the radially outer side of the outer diameter section from the roller raceway provided on the inner peripheral surface of the outer diameter section.

3. A method of assembling a pulley apparatus with built-in roller clutch of claim 1, wherein the second ball bearing is mounted to between the pulley member and the shaft member by a method selected from the group of pressure-fitting, crimping, welding and adhesion bonding.

4. A method of assembling a pulley apparatus with built-in roller clutch for use in belt transmission of an auxiliary machinery of an engine, the pulley apparatus comprising a pulley member, a shaft member provided on the radially inner side of the pulley member, a first ball bearing provided between the pulley member and the shaft member on one side in the axial direction thereof, a second ball bearing provided between the pulley member and the shaft member on the other side in the axial direction thereof, and a roller clutch provided between the pulley member and the shaft member, a. the first ball bearing comprising an outer diameter section provided in the inner peripheral portion of the pulley member and having a first outer raceway in the inner peripheral surface thereof, an inner diameter section provided in the outer peripheral portion of the shaft member and having a first inner raceway in the outer peripheral surface thereof, and a plurality of first balls provided between the first inner raceway and the first outer raceway, b. the second ball bearing comprising an outer race separated from the pulley member, fitted into the inner peripheral surface of the pulley member and having a second outer raceway in the inner peripheral surface thereof, an inner race fitted onto the outer peripheral surface of the shaft member to cooperate with the shaft member to form a shaft member unit and having a second inner raceway in the outer peripheral surface thereof, and a plurality of second balls provided between the second inner raceway and the second outer raceway, c. the roller clutch adapted to be locked in one of the rotation directions and unlocked in the other of the rotation directions, and comprising an outer diameter section provided in the inner peripheral portion of the pulley member, an inner diameter section provided in the outer peripheral portion of the shaft member and having a cam portion on the outer peripheral surface thereof, a plurality of rollers provided between the outer peripheral surface of the inner diameter section and the inner peripheral surface of the outer diameter section, a retainer provided between the outer diameter section and the inner diameter section and having pockets to hold the rollers on the inside thereof, respectively, and a plurality of springs engaged with the retainer to press the rollers, respectively, d. the retainer of the roller clutch having a falling-prevention means for preventing the rollers from falling off, e. the shaft member unit having a plurality of step portions two of which are used to form a means to regulate displacement in the axial direction of the retainer of the roller clutch, f. the method comprising of holding the rollers in the pockets in the retainer of the roller clutch and pressing the rollers with the springs engaged with the retainer, respectively, thereby forming an assembly with the retainer installed in the inner diameter section of the roller clutch on the outer diameter side thereof, g. temporarily arranging a jig on the outer periphery of the rollers in the assembly, such that the jig has a means to press the rollers of the assembly radially inward of the assembly, h. then, mounting the outer diameter section of the roller clutch around the assembly while pushing the rollers with the jig radially inward of the assembly and simultaneously compressing the springs, and i. then, mounting the second ball bearing to between the inner peripheral surface of the pulley member and the outer peripheral surface of the shaft member.

5. A pulley apparatus with built-in roller clutch for use in belt transmission of an auxiliary machinery of an engine comprising a pulley member, a shaft member provided on the radially inner side of the pulley member, a first ball bearing provided between the pulley member and the shaft member on one side in the axial direction thereof, a second ball bearing provided between the pulley member and the shaft member on the other side in the axial direction thereof, and a roller clutch provided between the pulley member and the shaft member, a. the first ball bearing comprising an outer diameter section provided in the inner peripheral portion of the pulley member and having a first outer raceway in the inner peripheral surface thereof, an inner diameter section provided in the outer peripheral portion of the shaft member and having a first inner raceway in the outer peripheral surface thereof, and a plurality of first balls provided between the first inner raceway and the first outer raceway, b. the second ball bearing comprising an outer race separated from the pulley member, fitted into the inner peripheral surface of the pulley member and having a second outer raceway in the inner peripheral surface thereof, an inner race fitted onto the outer peripheral surface of the shaft member to cooperate with the shaft member to form a shaft member unit and having a second inner raceway in the outer peripheral surface thereof, and a plurality of second balls provided between the second inner raceway and the second outer raceway, c. the roller clutch adapted to be locked in one of the rotation directions and unlocked in the other of the rotation directions, and comprising an outer diameter section provided in the inner peripheral portion of the pulley member, an inner diameter section provided in the outer peripheral portion of the shaft member and having a cam portion on the outer peripheral surface thereof, a plurality of rollers provided between the outer peripheral surface of the inner diameter section and the inner peripheral surface of the outer diameter section, a retainer provided between the outer diameter section and the inner diameter section and having pockets to hold the rollers on the inside thereof, respectively, and a plurality of springs engaged with the retainer to press the rollers, respectively, d. the retainer of the roller clutch having a falling-prevention means for preventing the rollers from falling off, e. the outer diameter section of the roller clutch having a roller raceway on the inner peripheral surface thereof, f. the shaft member unit having a plurality of step portions two of which are used to form a means to regulate displacement in the axial direction of the retainer of the roller clutch, g. with the rollers and the roller raceway on the inner peripheral surface of the outer diameter section of the roller clutch, at least the roller raceway of the outer diameter section of the roller clutch being formed with a bevel at one end thereof to simultaneously compress the springs.

6. A pulley apparatus with built-in roller clutch of claim 5, wherein in the state where the retainer of the assembly is coaxially combined with the outer diameter section of the roller clutch, the total amount of a width of the bevel at the end of the rollers and a width of the bevel at the end of the roller raceway of the outer diameter section is larger than the amount by which the rollers project toward the radially outer side of the outer diameter section from the roller raceway provided on the inner peripheral surface of the outer diameter section.

7. A pulley apparatus with built-in roller clutch of claim 5, wherein the second ball bearing is mounted to between the pulley member and the shaft member by a method selected from the group of pressure-fitting, crimping, welding and adhesion bonding.

* * * * *